US007512130B2

(12) United States Patent
Nakahira

(10) Patent No.: US 7,512,130 B2
(45) Date of Patent: Mar. 31, 2009

(54) OPTICAL COMMUNICATION NETWORK SYSTEM

(75) Inventor: Yoshihiro Nakahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 646 days.

(21) Appl. No.: 11/061,603

(22) Filed: Feb. 22, 2005

(65) Prior Publication Data

US 2005/0185586 A1    Aug. 25, 2005

(30) Foreign Application Priority Data

Feb. 25, 2004    (JP)    ............................. 2004-049067

(51) Int. Cl.
*H04L 12/28*    (2006.01)
*H04J 3/16*    (2006.01)
(52) U.S. Cl. .................................. 370/395.2; 370/468
(58) Field of Classification Search ................ 370/229, 370/230, 235, 237, 395.21, 395.2, 395.32, 370/395.4, 395.41, 395.42, 468; 398/45, 398/49, 57
See application file for complete search history.

(56) References Cited

U.S. PATENT DOCUMENTS

| 6,092,113 | A | 7/2000 | Maeshima et al. |
| 6,097,722 | A * | 8/2000 | Graham et al. .......... 370/395.21 |
| 7,209,434 | B2 * | 4/2007 | Kano et al. .................. 370/216 |
| 7,257,120 | B2 * | 8/2007 | Saunders et al. ....... 370/395.21 |
| 7,315,693 | B2 * | 1/2008 | Ovadia et al. .................. 398/57 |
| 2003/0067880 | A1 | 4/2003 | Chiruvolu |
| 2003/0223359 | A1 * | 12/2003 | Einstein et al. ............. 370/228 |
| 2004/0109687 | A1 * | 6/2004 | Park et al. ...................... 398/57 |

FOREIGN PATENT DOCUMENTS

| JP | 05-068049 | 3/1993 |
| JP | 05-268250 | 10/1993 |
| JP | 2000-232483 | 8/2000 |
| JP | 2003-273908 | 9/2003 |
| JP | 2003-273909 | 9/2003 |

OTHER PUBLICATIONS

Nakahira et al. "Dynamic Optical Path Allocation System Based on Network Traffic", Technical Report of IEICE CS2003-56, Jul. 2003.

(Continued)

*Primary Examiner*—Chirag G Shah
*Assistant Examiner*—Srinivasa R Reddivalam
(74) *Attorney, Agent, or Firm*—Venable LLP; James R. Burdett

(57) ABSTRACT

An optical communication network for sheltering traffic by a simple processing when a communication path is dynamically changed. In the optical communication network system according to the present invention, the sufficiency of a resource for setting a new communication path is confirmed, and if the resource is insufficient, a communication path to be cancelled is selected from current communication paths of which priority is lower than the new communication path, so as to secure the resource, and the IP traffic of the current communication path to be cancelled is sheltered to another communication path, the current communication path is cancelled after this sheltering completes, and then the new communication path is set. When the current communication path is cancelled, the traffic of this current communication path is sheltered to another communication path before cancellation, so the loss of traffic can be prevented merely by a simple processing.

27 Claims, 18 Drawing Sheets

OTHER PUBLICATIONS

"An Algorithm to Reconfigure Logical Topologies in Reliable WDM Networks" Shinya Ishida et al., Technical Report of IEICE 2002-9, Apr. 2002, pp. 49-54.

"A Traffic Engineering System for Multilayer Networks Based on the GMPLS Paradigm", Iovanna et al., IEEE Network, Mar./Apr. 2003, pp. 28-37.

* cited by examiner

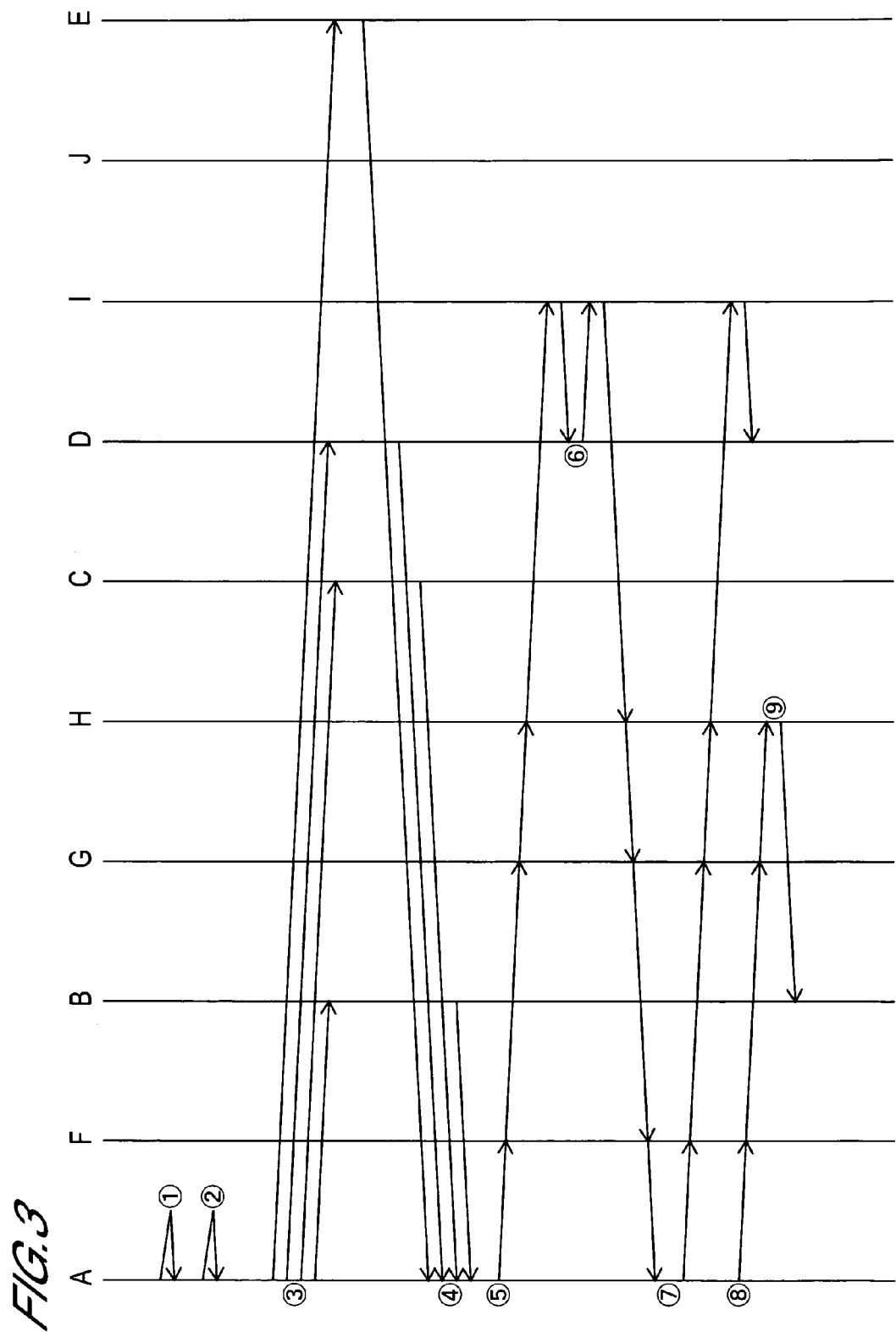

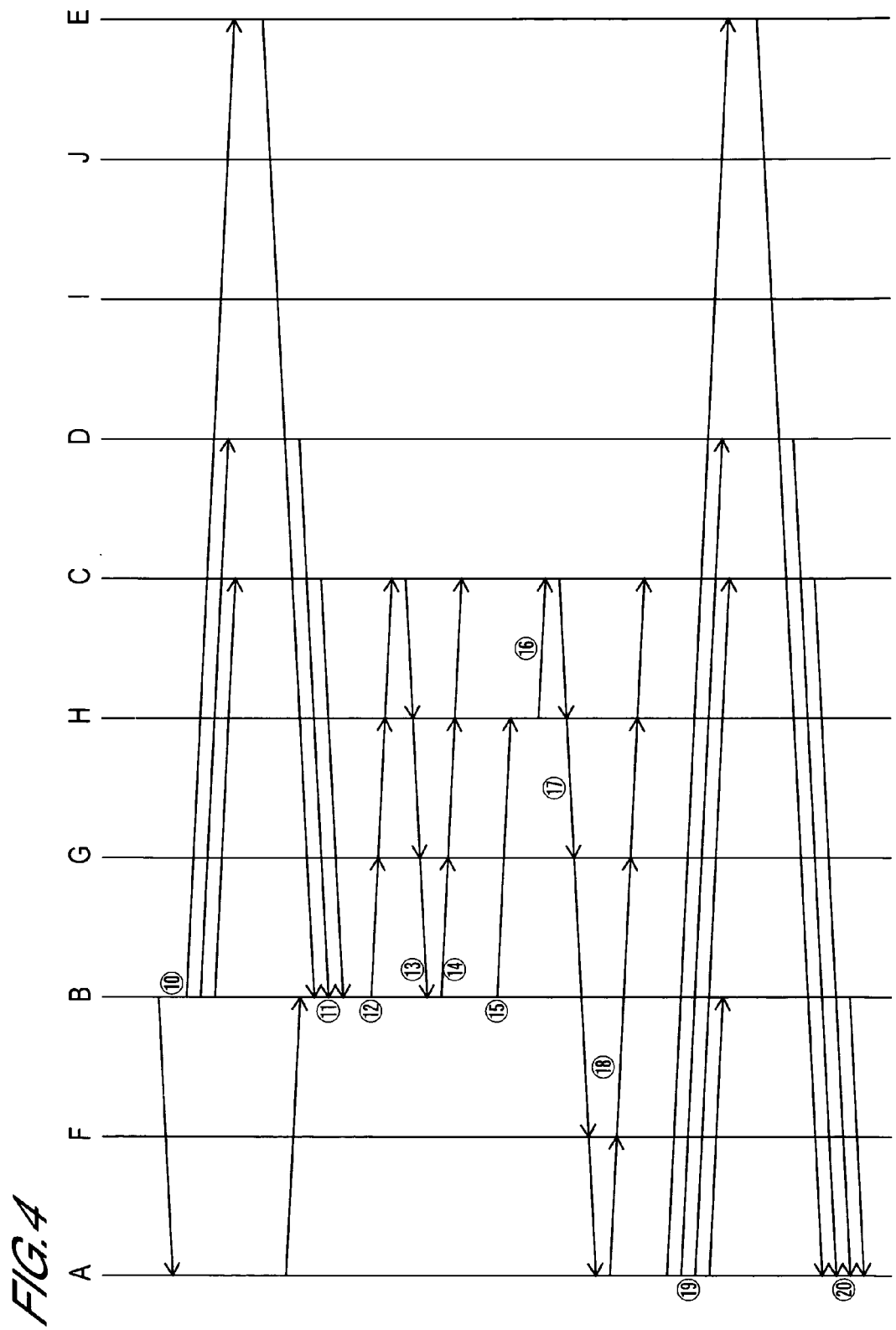

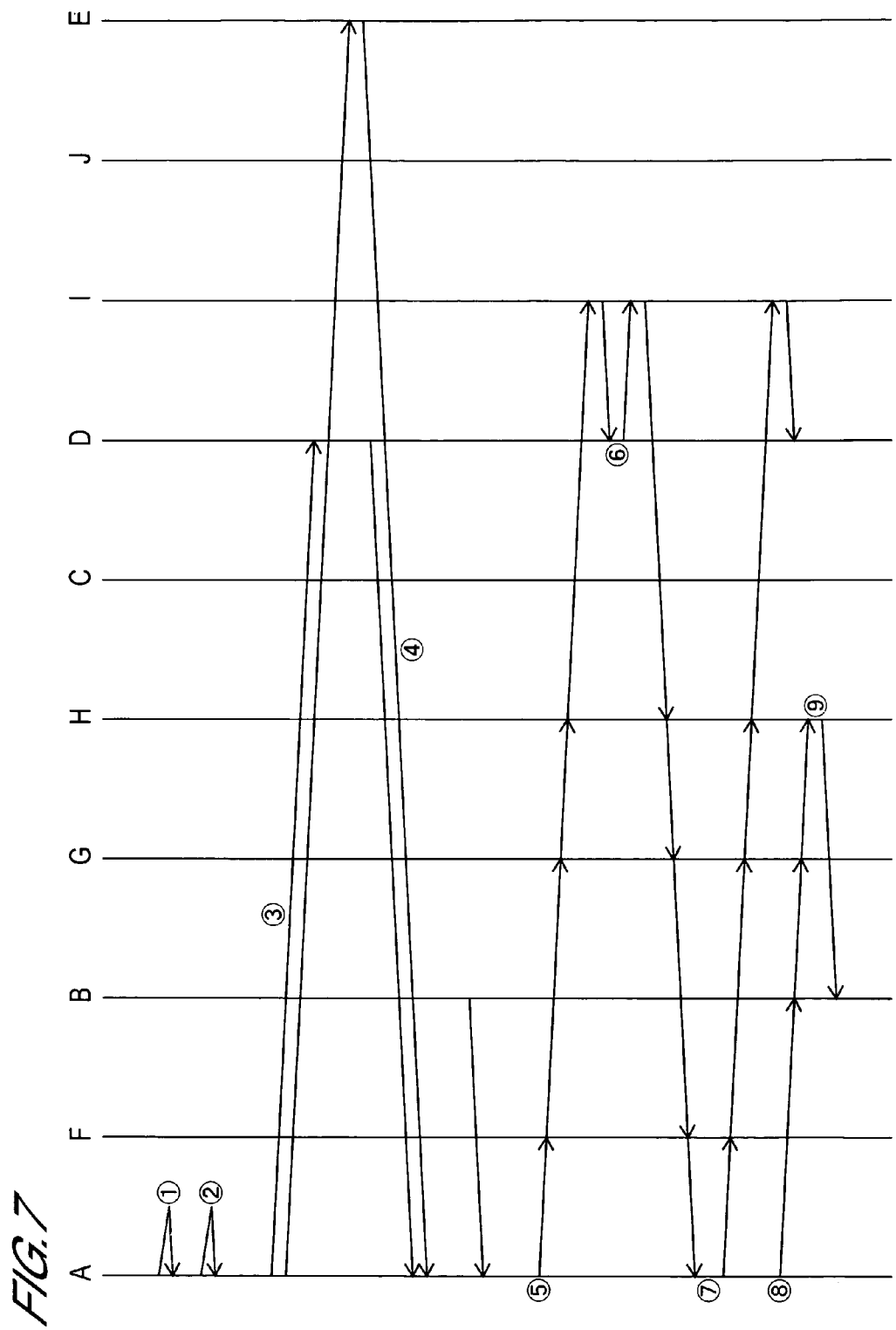

⟷ PSC-LSP

⟷ LSC-LSP

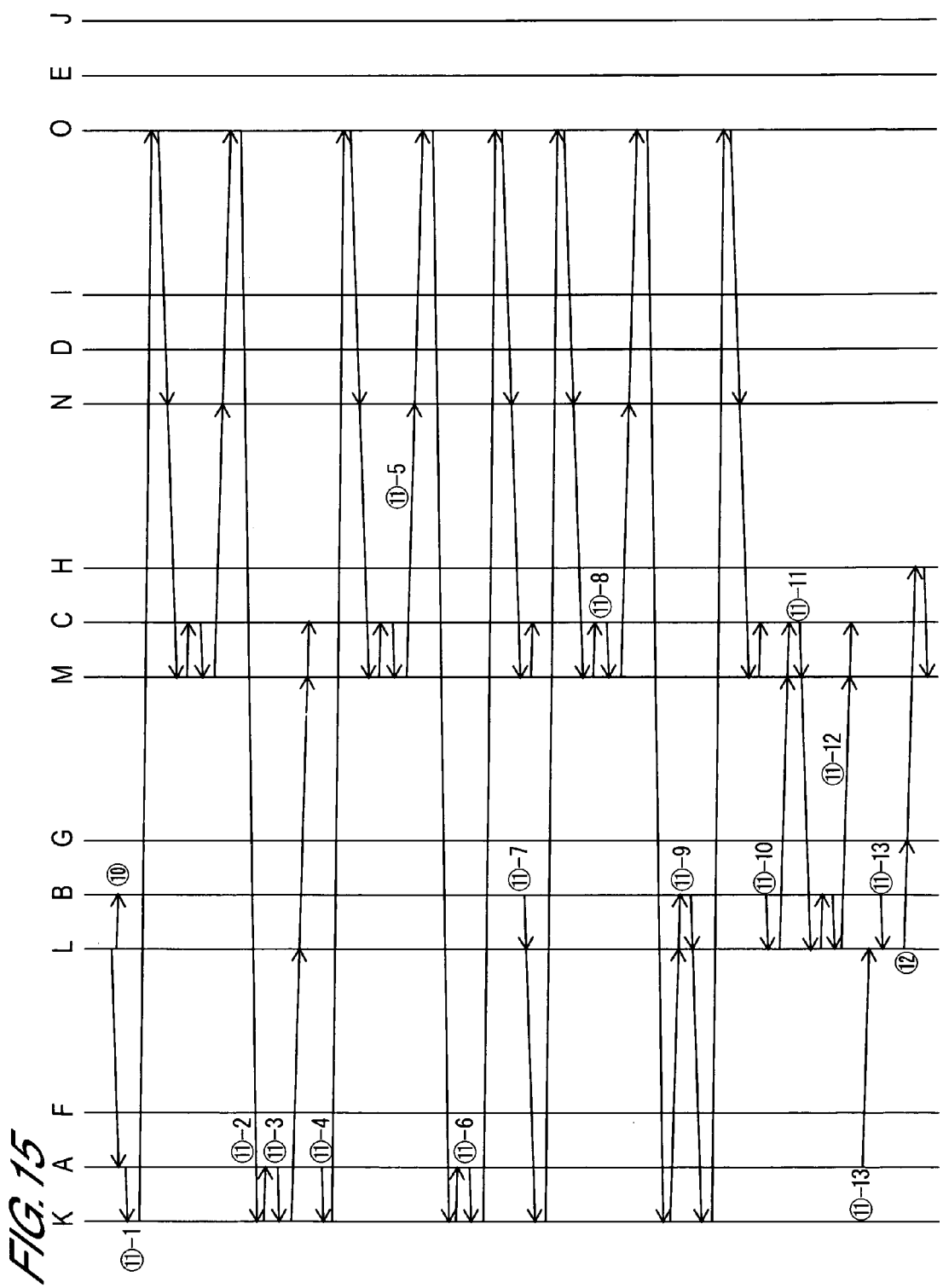

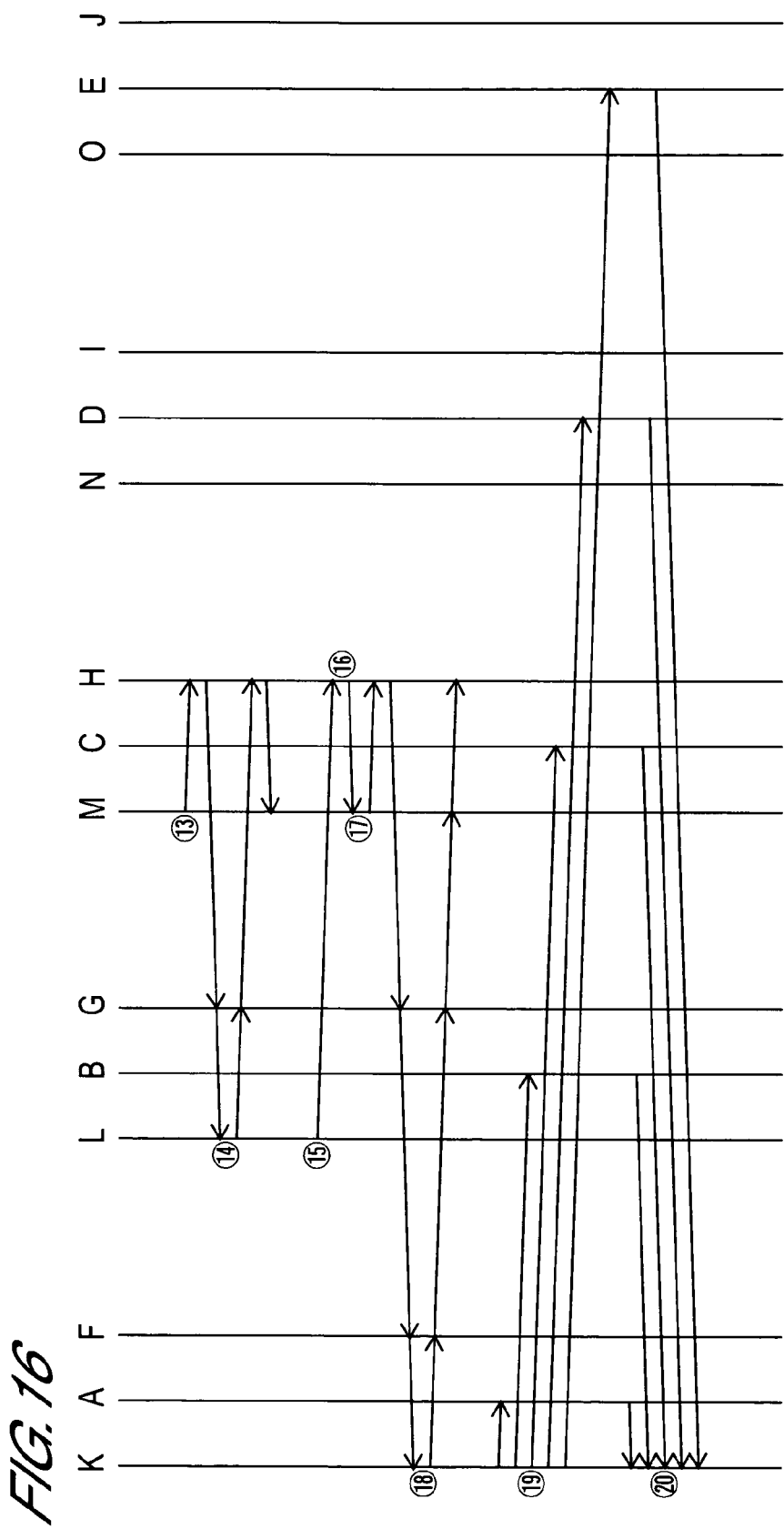

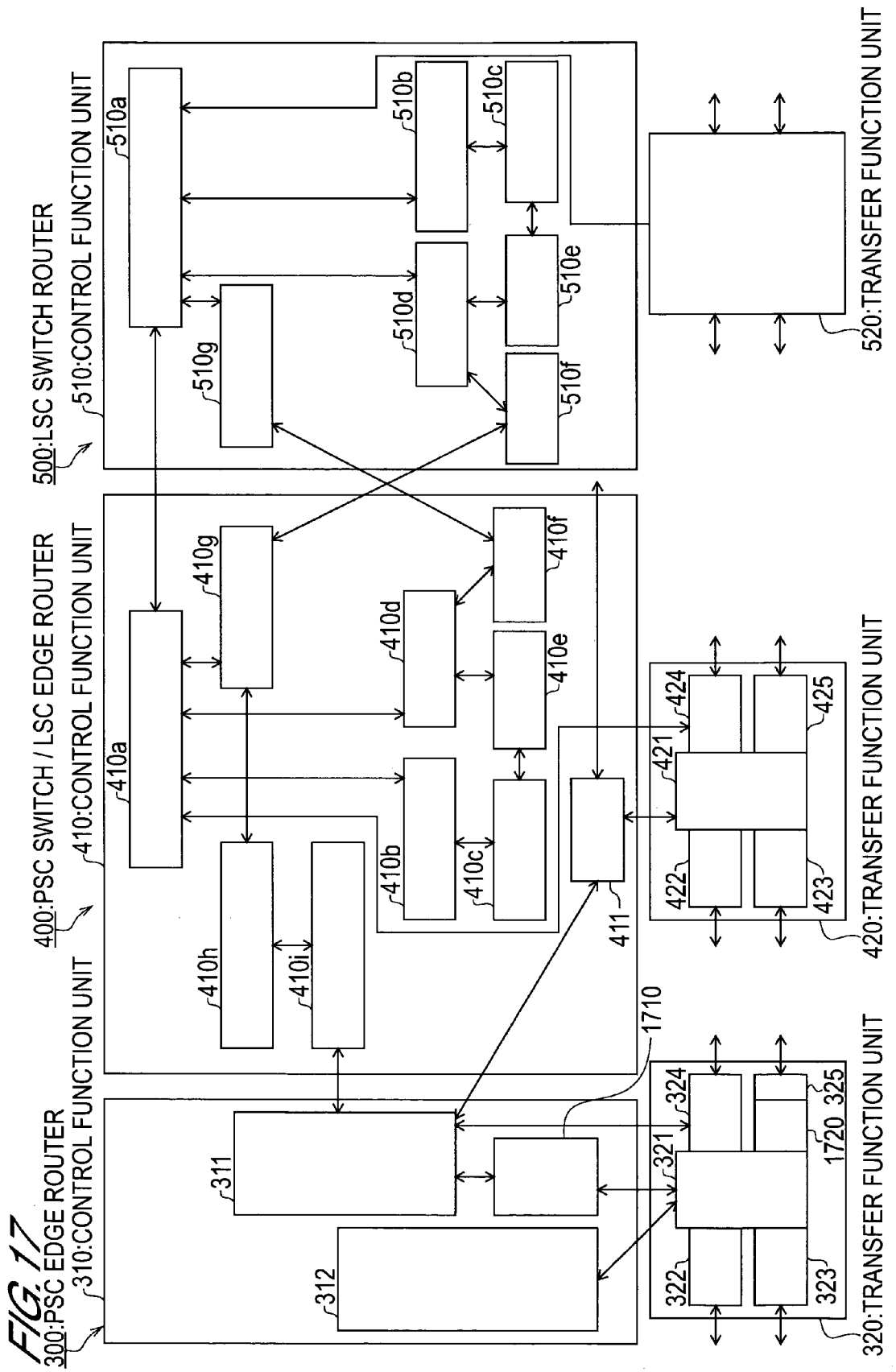

OPTICAL COMMUNICATION NETWORK SYSTEM

BACKGROUND OF THE INVENTION

1. Field of the Invention

The present invention relates to a technology for dynamically setting the communication path of an optical communication network system having a priority control function. The present invention can be applied to an optical communication network system for the Internet, for example.

2. Description of Related Art

The communication network can be divided into controllable domains which the maintenance administrator can control and manage, and external domains which the administrator cannot control and manage. When a plurality of communication paths are constructed in a controllable domain, it is desirable to allocate larger the line capacity of the communication path of which the data transfer volume is large, and to allocate smaller the line capacity of the communication path of which the data transfer volume is small. Resources can be effectively used by setting paths corresponding to the dispersion of traffic in the communication system. However in the case of an IP communication network, such as the Internet, where traffic changes are very radical, it is difficult to construct a communication path estimating the volume of traffic in advance. Therefore it is desirable to construct a communication network system such that the communication paths can be dynamically changed according to the changes of the traffic distribution. Following references I and II are known as documents proposing a dynamic communication network system.

I. Japanese Patent Laid-Open Publication No. 2000-232483, and

II. "An Algorithm to Reconfigure Logical Topologies in Reliable WDM Networks" by Ishida and two others, Technical Report of IEICE 2002-9, April 2002, pp. 49-54.

In the communication network system of the reference I, the packet flow rate monitoring means PFM disposed in each packet exchange PEX monitors the traffic volume. The network management center NMC sets a new communication path in a block where traffic is high or deletes a communication path in a block where traffic is small based on the monitoring result of each packet flow rate monitoring means PFM.

In the reference II, a technology for decreasing the loss of packets when a current communication path is deleted and a new communication path is set is proposed.

However, a method for the network management center NMC to perform all the settings and cancellation of communication paths is used with the technology proposed in the reference I, so the entire system stops if the network management center NMC fails when a new path is attempted to be setup. Also to decrease the contention of the network management center NMC and network for control, the processing capability and communication capability must be increased, which increases cost.

According to the technology of reference II, a communication path to shelter traffic is established separately, for which resources are necessary.

SUMMARY OF THE INVENTION

It is an object of the present invention to provide an optical communication network system which can perform distributed processing for traffic engineering and can set a new path allocation so that losing traffic is minimized.

The present invention relates to an optical communication network system for dynamically changing communication paths constructed using a plurality of nodes, comprising: resource confirmation function which confirms the sufficiency of resources for newly setting the communication path; cancellation path select function which selects a communication path to be cancelled for securing the resource from current communication paths of which priorities are lower than the new communication path, when the resource is insufficient; traffic sheltering function which shelters traffic of the current communication path to be cancelled to another current communication path; path cancellation function (that is, path tear down function) which cancels the current communication path after sheltering of the traffic by the traffic sheltering function is completed; and path setting function which setting the new communication path after the path cancellation function cancelled the current communication path.

According to the present invention, a communication network system which can canceling the current communication path after sheltering the traffic of the current communication path to another communication path so as to prevent loss of the traffic, can be implemented by a distributed method.

BRIEF DESCRIPTION OF THE DRAWINGS

Other objects and advantages of the present invention are described with reference to the attached drawings below.

FIG. 3 is a diagram depicting the flow of a message in the communication path change processing according to the first embodiment;

FIG. 4 is a diagram depicting the flow of a message in the communication path change processing according to the first embodiment;

FIG. 7 is a diagram depicting the flow of a message in the communication path change processing according to the second embodiment;

FIG. 15 is a diagram depicting the flow of a message in the communication path change processing according to the third embodiment;

FIG. 16 is a diagram depicting the flow of a message in the communication path change processing according to the third embodiment;

FIG. 17 is a conceptual diagram depicting the configuration of a router according to the fourth embodiment.

DESCRIPTION OF THE PREFERRED EMBODIMENTS

Figure 1:
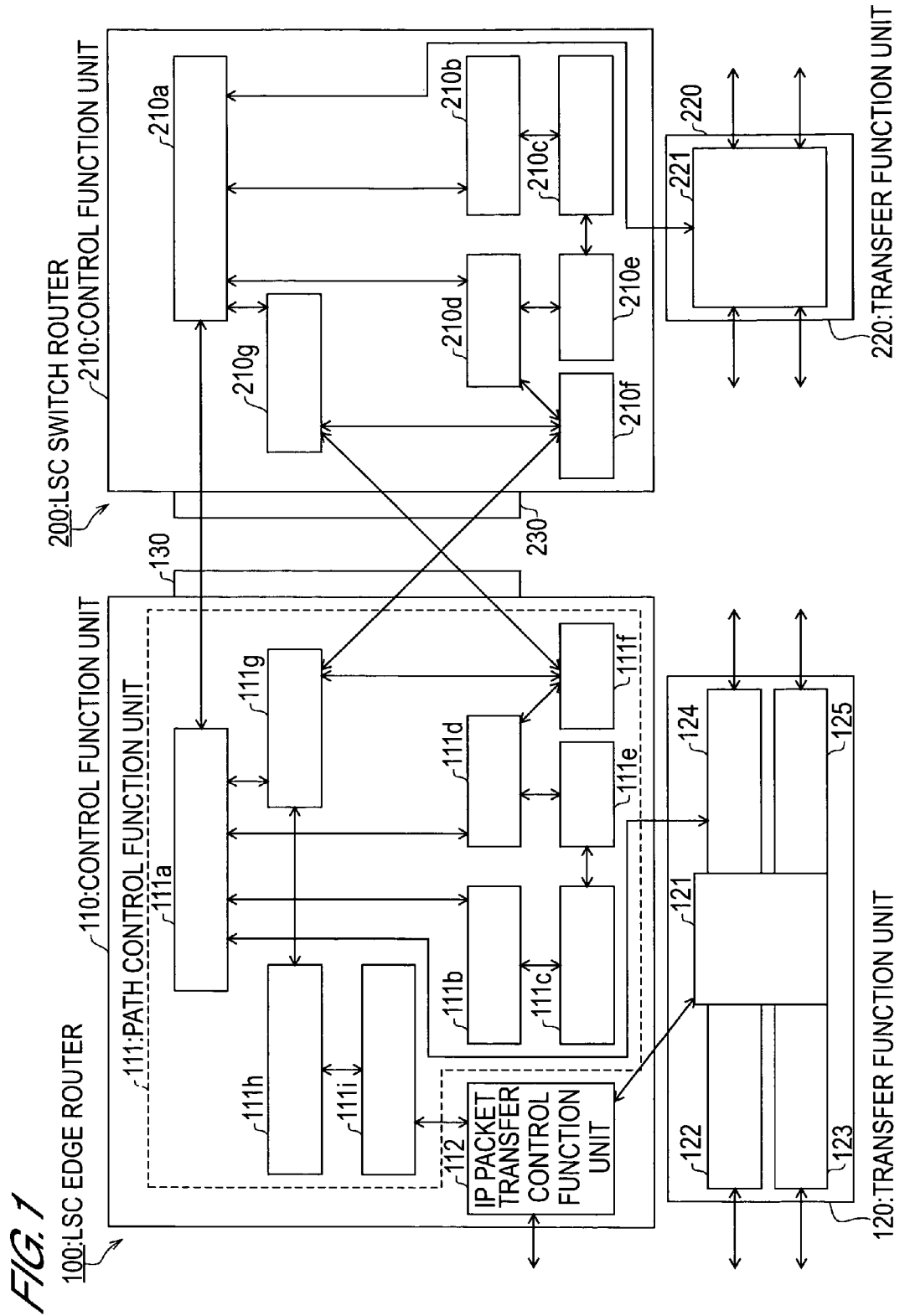
FIG. 1 is a conceptual diagram depicting the configuration of a router according to the first embodiment.

Embodiments of the present invention will now be described with reference to the drawings. In the drawings, the size, shape and positional relationship of each composing element is shown in general to assist in understanding the present invention, and the numerical conditions described below are merely examples.

Related Art

Figure 18A:
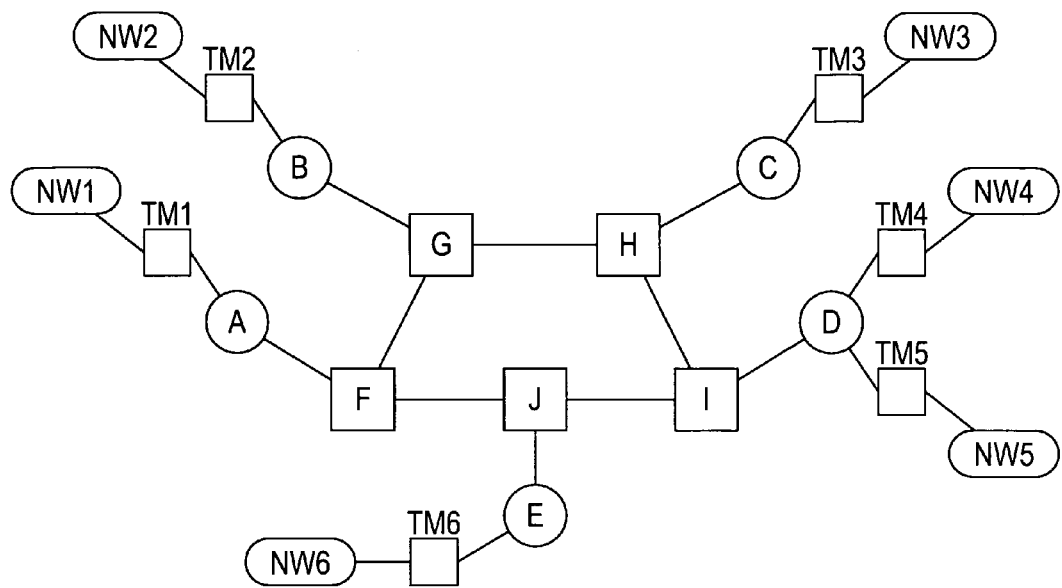
FIGS. 18A and 18B is a conceptual diagram depicting a conventional communication network system.
Figure 18B:
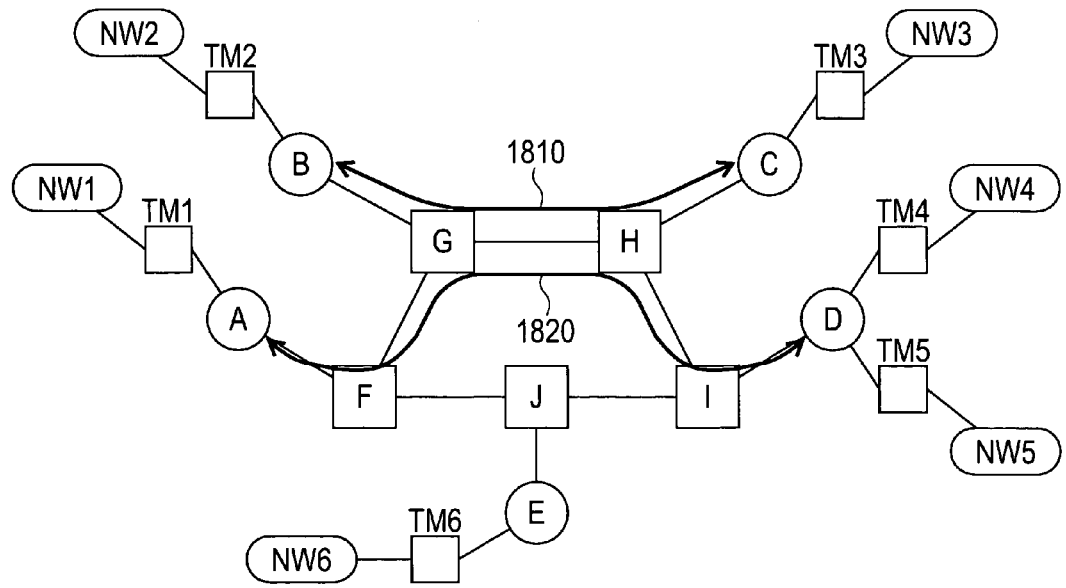

First, an example of network structure is explained using FIGS. 18A and 18B, supporting the explanation of the Preferred embodiments of the present invention.

The optical communication network system being using for the Internet comprises a plurality of nodes and links which inter-connect these nodes. For example, the optical communication network system shown in FIG. 18A comprises the routers A-E and the optical switches F-J as the nodes. And each node A-J is linked to one or a plurality of other nodes by optical fiber cables. The routers A-E are linked to the networks NW1-NW6 via the optical fiber cables and traffic monitors TM1-TM6 respectively.

The communication network can be divided into controllable domains which the maintenance administrator can control and manage, and external domains which the administrator cannot control and manage. In the example in FIG. 18A, the area comprised of the nodes A-J, traffic monitors TM1-TM6 and the optical fiber cables inter-connecting these are the controllable domains. The external networks NW1-NW6 are the external domains. In other words, the boundaries of the controllable domains and the external domains exist on the optical fiber cables connecting the traffic monitors TM1-TM6 and the external networks NW1-NW6.

In terms of functions, a controllable domain can be divided into a transfer plane and a control plane. Here the transfer plane is a plane used for transferring data traffic, and the control plane is a plane used for controlling and managing networks.

A controllable domain can further divide hierarchically for a plurality of domains according to the construction method of the communication path. Such domains are, for example, the IP (Internet Protocol) domain of an ordinary IP network, a PSC (Packet Switch Capable) domain where the communication path network is established by packets, an L2SC (Layer 2 Switch Capable) domain where the communication path network is constructed by the switch function of the layer 2, a TDM (Time Division Multiplexing) domain where the communication path network is constructed by time division multiplexing, an LSC (Lambda Switch Capable) domain where the communication path network is constructed by optical wavelengths, and an FSC (Fiber Switch Capable) domain where the communication path network is constructed by optical fibers.

As the means for identifying a communication path (that is a label), a packet header is used for the PSC domain, an L2 cell header is used for the L2SC domain, a time division multiplexing channel number is used for the TDM domain, a optical wavelength is used for an LSC domain, and a physical fiber position is used for an FSC domain respectively. The communication path that is constructed using a label is called the LSP (Label Switched Path). For example, the communication path of the LSC domain is called the LSC-LSP, and the communication path of the FSC domain is called the FSC-LSP.

FIG. 18B shows an example when an LSC-LSP is constructed in the system in FIG. 18A. In the example of FIG. 18B, two LSC-LSPs 1810 and 1820 are constructed. The LSC-LSP 1810 uses a same optical frequency in the optical path B-G-H-C. In the same way, the LSC-LSP 1820 uses a same frequency in the optical path A-F-G-H-I-D. The routers F, G, H and I perform switching using the optical frequency as a label respectively.

First Embodiment

The communication network system according to the first embodiment of the present invention will be described with reference to FIG. 1-FIG. 4.

The general configuration of the communication network system of the present embodiment is the same as that of a network system drawn in FIG. 18A. In the present embodiment, a communication path is constructed in the above mentioned LSC domain. Therefore an edge router, having an LSC interface (hereafter called "LSC edge router"), is used for the routers A-E, and a switch router for relaying and cross-connecting LSC-LSP (hereafter called "LSC switch router"), is used for the optical switches F-J.

FIG. 1 is a block diagram depicting the general configuration of the key functional sections of the LSC edge router and LSC switch router according to the present embodiment. The LSC edge router 100 in FIG. 1 is used as the routers A-E in FIG. 18A. And the LSC switch router 200 in FIG. 1 is used as the optical switches F-J in FIG. 18A.

The LSC edge router 100 switches the output direction of input user signal in packet units. This LSC edge router 100 comprises a control function unit 110, transfer function unit 120 and control interface 130.

The control function unit 110 further comprises a path control function unit 111 and IP packet transfer control function unit 112. The path control function unit 111 controls the switching of the output direction of the LSC path and the switching of the optical path in IP packet units. The IP packet transfer control function unit 112 controls the output direction in IP packet units. Each function in the path control function unit 111 will be described in detail later.

The transfer function unit 120 further comprises an IP packet transfer function unit 121, IP router interface function 122, router interface function 123, LSC path termination interface function 124, and LSC path termination interface function 125. The IP packet transfer function unit 121 transfers IP packets. The IP router interface function 122 and the router interface function 123 are interface functions similar to that of a conventional IP router. The LSC path termination interface function 124 and LSC path termination interface function 125 are functions to terminate an LSC path. The LSC path termination physical function 124, LSC path termination interface function 125 and LSC path termination function may be in a device that is separate from an IP router.

The control interface 130 is an interface for transmitting/receiving control signals between routers.

The LSC switch router 200 switches the output direction in LSC path units. The LSC switch router 200, however, does not switch the output direction in packet units. The LSC switch router 200 further comprises a control function unit 210, transfer function unit 220 and control interface 230.

The control function unit 210 controls the switching of the output direction of the LSC path, just like the path control function unit 111 of the LSC edge router 110. However the control function unit 210 does not have the function for controlling the switching of an IP packet transfer route.

The transfer function unit 220 further comprises a path switch function unit 221. The path switch function unit 221 switches the direction of an IP packet.

The control interface 230 is an interface for transmitting/receiving control signals between routers.

Now the operation of the communication network system according to the present embodiment will be described with reference to FIG. 2A to FIG. 4.

Figure 2A:
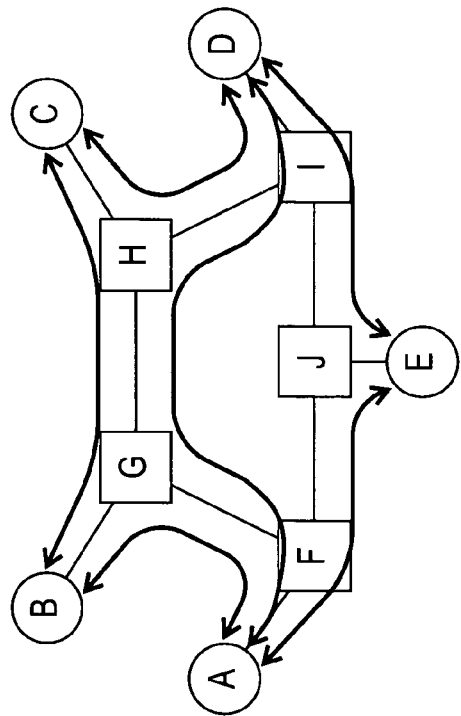
FIG. 2A to 2D is a conceptual diagram depicting the communication path change processing according to the first embodiment.

FIG. 2A shows an example of the initial LSC path status (before change). In FIG. 2A to 2D, the traffic monitors TM1-TM6 and the external networks NW1-NW6 are omitted. In the example shown in FIG. 2A, the optical path A-F-G-B, optical path B-G-H-C, optical path C-H-I-D, optical path A-F-G-H-I-D, optical path A-F-J-E and optical path D-I-J-E are set.

Now the case when a request to set a new optical path A-F-G-H-C (see FIG. 2B) is issued in this path status will be considered. This request is issued by a management function unit, which is not illustrated, in each router, for example. This management function unit requests to set a new optical path according to the information acquired from the traffic monitors TM1-TM5 (see FIG. 18A). Now the case when the management function unit (not illustrated) in the router A issues a request to set a path will be described as an example.

When a new optical path is set, a path setup instruction is first sent to each node A, F, G, H and C on the control plane. By this the resource securing operation for setting the new optical path is executed in each node A, F, G, H and C. And if such a resource is not available, an optical path, of which priority is low, is cancelled. In the present embodiment, it is assumed that the optical path A-F-G-H-I-D, of which priority is low, is cancelled to secure a resource between the nodes G and H (see FIG. 2C). In the communication network system of the present embodiment, the cancellation of the optical path A-F-G-H-I-D is broadcasted to all the nodes before actual cancellation. On receiving this notice, the routers A-E change the transfer route of the IP packet so as not to use the optical path A-F-G-H-I-D. And after changing the transfer route, the optical path A-F-G-H-I-D is cancelled, and the new optical path A-F-G-H-C is set (see FIG. 2D).

An example of the specific procedure to set such an optical path will now be described with reference to FIG. 3 and FIG. 4. The number of parentheses in the following description corresponds to a number in a circle in FIG. 3 and FIG. 4.

Here the case when the necessity of setting a new path is judged by the system control unit (not illustrated) in the router A will be described as an example.

Figure 2B:
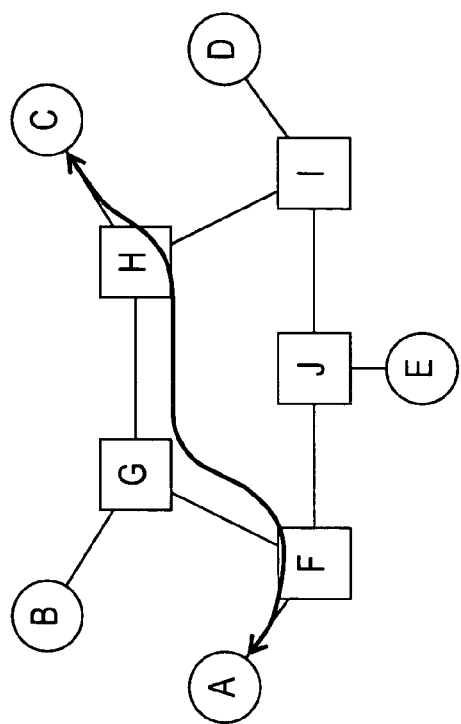
Figure 2C:
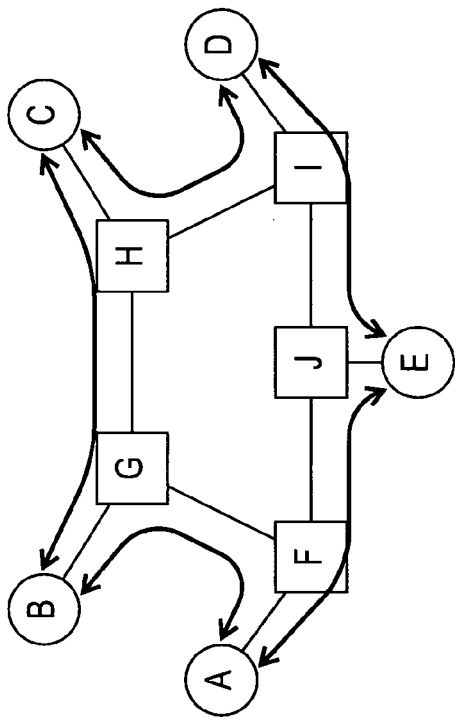
Figure 2D:
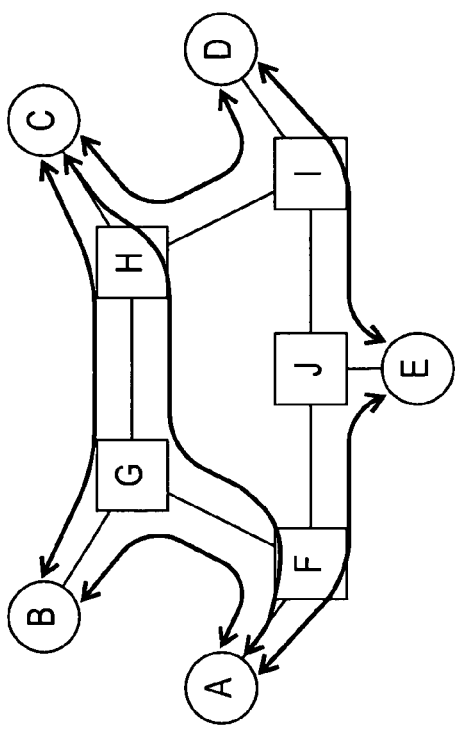

(1) First the system control unit requests the path control function unit 111 (see FIG. 1) in the router A to set the optical path A-F-G-H-C (see FIG. 2B).

(2) The path setup cancellation function 111*a* in the path control function unit 111 inquires the path setup resource confirmation update function 111*b* whether a resource for setting the new optical path A-F-G-H-C is available. The path setup resource confirmation update function 111*b* judges the availability of the resource using the path resource information stored in the path resource information management function 111*c*, and replies to the path setup cancellation function 111*a*. If the received reply is that the resource required for setting the path is insufficient, the path setup cancellation function 111*a* requests the path resource insufficiency handling function 111*d* to execute resource securing processing. The path resource insufficiency handling function 111*d* has the cancellation path search function 111*e* check the availability of an optical path that can be cancelled. The cancellation path search function 111*e* decides the optical path to be cancelled (optical path A-F-G-H-I-D in this case) using the path resource information stored in the path resource information management function 111*c*. This decision result is sent to the path setup cancellation function 111*a* via the path resource insufficiency handling function 111*d*. When this decision result is received, the path setup cancellation function 111*a* decides to cancel the optical path A-F-G-H-I-D. And the path cancellation request function 111*f* requests the path cancellation request reception handling function 111*g* to cancel the optical path A-F-G-H-I-D.

(3) The path cancellation request reception handling function 111*g* inquires the IP packet transfer route change necessity judgment function 111*h* whether a change of the IP packet transfer route is necessary. The IP packet transfer path change necessity judgment function 111*h* judges whether it is possible that traffic will be lost if the optical path A-F-G-H-I-D is cancelled in this status. The judgment result is sent to the path cancellation request reception handling function 111*g*. If it is judged that a change of the IP packet transfer route is necessary, the path cancellation request reception handling function 111*g* requests the IP packet transfer control function unit 112 to change the transfer route so as to not use the optical path A-F-G-H-I-D via the IP packet transfer route change necessity judgment function 111*h* and the IP packet transfer route change request function 111*i*. The IP packet transfer control function unit 112 changes the route table according to this request. This request is also sent from the IP packet transfer control function unit 112 to the IP packet transfer control function unit 112 in other routers, B-E, and a similar change processing is executed. The route after change may be decided by the IP packet transfer control function unit 112 of each router or may be decided by the router A. Basically it is desirable for the IP packet transfer control function unit 112 of each router to decide in the case of dynamic routing, and it is desirable for the router A to decide in the case of static routing.

In the present embodiment, a transfer route change request is sent from the router A to the other routers, B-E, but if a protocol in which each router knows the network configuration, such as OSPF (Open Shortest Path First) is used, the cancellation of an optical path may be notified to the protocol, and the cancellation of the optical path is broadcasted from the protocol to the entire network. If such a protocol as OSPF is used, the route table is changed according to the notification of the optical path cancellation.

(4) The routers B-E report to router A that the route table change processing completed.

(5) After the IP packet is sheltered from the optical path to be cancelled, the path cancellation request reception handling function 111*g* of the router A requests the path setup cancellation function 111*a* to cancel the optical path. And the path setup cancellation function 111*a* issues a cancellation instruction of the optical path A-F-G-H-I-D. This instruction is transferred in the sequence of nodes A→F→G→H→I→D by the path setup cancellation functions 111*a* and 210*a* of these nodes. Such an instruction transfer can be implemented by modifying the RFC (Request For Comment) 3471-RFC 3473 standards of the IEFT (Internet Engineering Task Force). Each router which received the cancellation instruction cancels the corresponding path. When the path is cancelled, the setting of each interface function 122, 123, 124 and 125 is changed, and the data base information of the path resource information management function 111c and 210c is rewritten (see FIG. 1).

(6) When the cancellation instruction reaches the termination router D, the path setup cancellation function 111a of the router D issues a path cancellation completion notice. This path cancellation completion notice is transferred in the sequence of node D→I→H→G→F→A by the path setup cancellation functions 111a and 210a of these nodes. By this, the completion of cancellation of the path is reported to the router A.

(7) When the path cancellation completion notice is received, the path setup cancellation function 111a of the router A issues a confirmation notice to confirm the receipt of this notice. This notice is transferred in the sequence of nodes A→F→G→H→I→D by the path setup cancellation functions 111a and 210a of these nodes. By this, the resource securing processing for setting the new optical path A-F-G-H-C completes.

(8) Then the new optical path A-F-G-H-C setting processing is executed. In this processing, the path setup cancellation function 111a of the router A issues an instruction to set the optical path A-F-G-H-C. This setup instruction is sent from the path setup cancellation function 111a of the router A to the path setup cancellation function 210a (see FIG. 1) of the optical switch F. When this setup instruction is received, the path setup cancellation function 210 of the optical switch F checks whether a resource between nodes F-G has room (that is, non-used wavelength) using the path setup resource confirmation update function 210b and path resource information management function 210c. If the resource has room, the path setup cancellation function 210a of the optical switch F reserves this resource of the optical path, and transfers the setup instruction to the switch G. The switch G checks a resource between nodes G-H by a similar method, reserves the resource, and transfers the setup instruction if room is available. In the same way, the switch H checks a resource between nodes H-C.

(9) Now the case when a resource for setting the new optical path is not available between nodes H-C will be considered. In this case, the path setup cancellation function 210a of the switch H selects a cancellation candidate using the path resource insufficiency handling function 210d and the cancellation path search function 210e. Here it is assumed that the optical path B-G-H-C is selected as the cancellation candidate. The path setup cancellation function 210a of the switch H checks the priority of the optical path B-G-H-C. If this priority is lower than the priority of the new optical path A-F-G-H-C, the path setup cancellation function 210a of the switch H decides to cancel the optical path B-G-H-C. If such a decision is made, the path cancellation request function 210f of the switch H requests the path cancellation request reception handling function 111g of the router B to cancel the optical path B-G-H-C.

(10) The router B notifies the other LSC edge routers A, C, D and E that the optical path B-G-H-C will be cancelled.

(11) When this notice is received, the LSC edge routers A, C, D and E change the route table, and sends a notice to indicate the completion of change to the router B.

(12) When this notice is received, the path setup cancellation function 111a of the router B issues a cancellation instruction for the optical path B-G-H-C. This instruction is transferred in the sequence of the nodes B→G→H→C by the path setup cancellation function of these nodes.

(13) The nodes B, G, H and C cancel the path according to the cancellation instruction, just like the above (5). To cancel the path, the path cancellation request reception handling functions 111g and 210g are used. And the path cancellation completion notice, similar to that of the above (6), is transferred in the sequence of C→H→G→B. By this, the completion of cancellation of the path is reported to the router B.

(14) When this path cancellation completion notice is received, the path setup cancellation function 111a of the router B issues a confirmation notice for confirming the reception of this notice, just like the above (7). This notice is transferred in the sequence of the nodes B→G→H→C by the path setup cancellation function of these nodes.

(15) And the path setup cancellation function 111a of the router B sends a notice to indicate the completion of cancellation processing of the optical path B-G-H-C to the switch H as a reply to the cancellation request in the above (9).

(16) When this notice is received, the switch H checks a resource between the nodes H-C again. And the switch H reserves an resource's room (that is, non-used wavelength) and transfer the setup instruction of the new optical path A-F-G-H-C to the router C.

(17) When this setup instruction is received, the router C issues a path setup completion notice. This path setup completion notice is transferred in the sequence of the nodes C→H→G→F→A by the path setup cancellation function of these nodes. By this, the completion of the setup of the path is reported to the router A.

(18) When the path setup completion notice is received, the path setup cancellation function 111a of the router A issues a confirmation notice to confirm the receipt of this notice. This notice is transferred in the sequence of the nodes A→F→G→H→C by the path setup cancellation function of these nodes.

(19) Also the path setup cancellation function 111a of the LSC edge router A notifies the other LSC edge routers B, C, D and E that the new optical path A-F-G-H-C is now available.

(20) The routers B, C, D and E change the setup of the transfer function unit 120, and notify the router A that this change is completed.

If such a protocol as OSPF is in use, the setup of the new optical path may be broadcasted from the protocol to the entire network.

As described above, according to the present embodiment, when one router cancels a current path setup, this setup is notified to other routers so that traffic is sheltered, therefore packet loss, due to the cancellation of a path, can be prevented.

Second Embodiment

The communication network system according to the second embodiment of the present invention will now be described with reference to FIG. 5 to FIG. 8.

The difference of the present embodiment from the above mentioned first embodiment is that when a communication path of which priority is low is to be cancelled, not only the route table is changed but also the traffic is sheltered by setting the IP tunnel (see the above mentioned processings (3) and (11) of the first embodiment).

Here an IP tunnel is a communication mode wherein the entire IP packet, including the header, is stored in the payload of another IP packet and is transferred. In the present embodiment, an IP packet addressed to the output side router is stored in another IP packet by the input side router of the communication path to be cancelled, and is transferred to the output side router via a route which is different from the communication path to be cancelled. And the IP packet addressed to the output side router is opened from the payload of the transferred IP packet.

Figure 5:
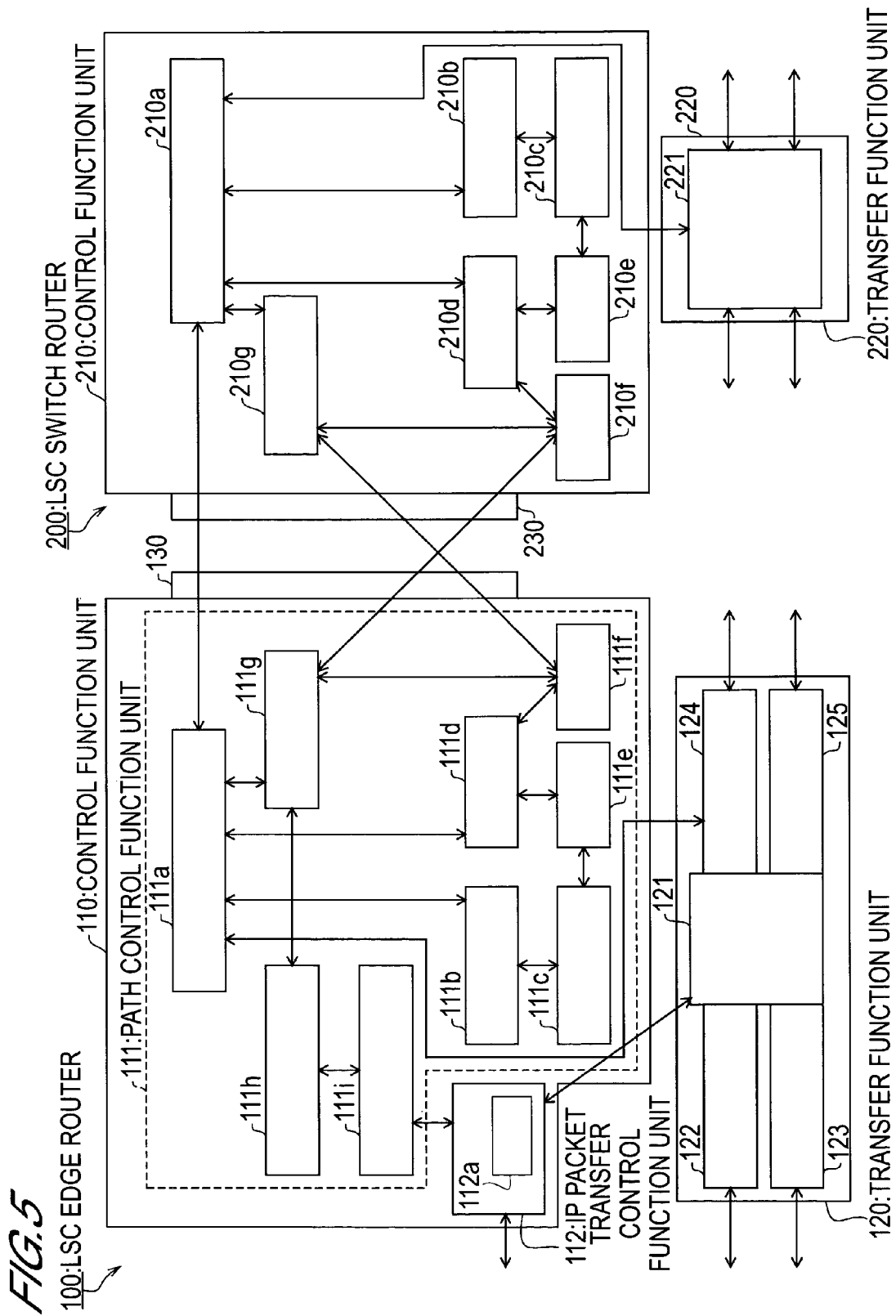
FIG. 5 is a conceptual diagram depicting the configuration of a router according to the second embodiment.
Figure 6A:
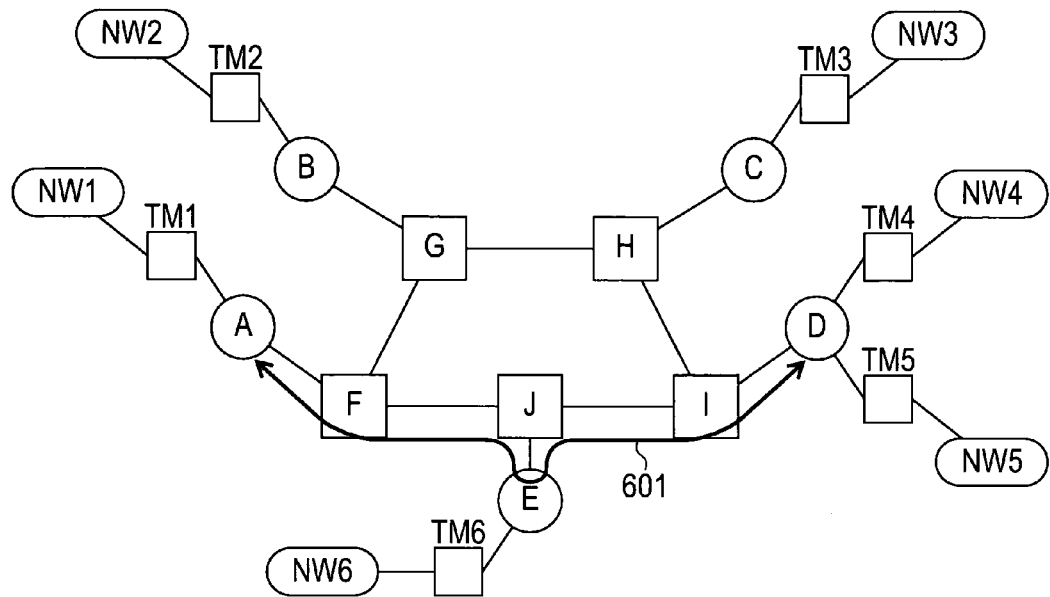
FIGS. 6A and 6B is a conceptual diagram depicting the communication path change processing according to the second embodiment.
Figure 6B:
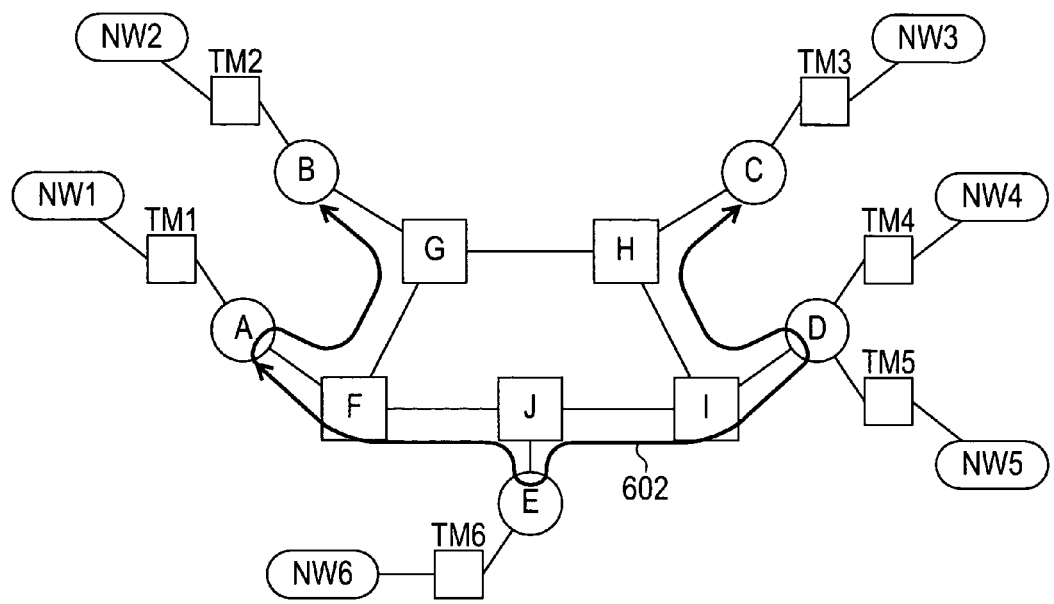

FIG. 5 is a block diagram depicting a functional configuration of the LSC edge router and the LSC switch router according to the present embodiment. In FIG. 5, composing elements the same as those in FIG. 1 are denoted with the same reference numerals. As FIG. 5 shows, in the LSC edge router 110 of the present embodiment, an IP tunnel setup function 112a is disposed in the IP packet transfer control function unit 112.

Figure 8:
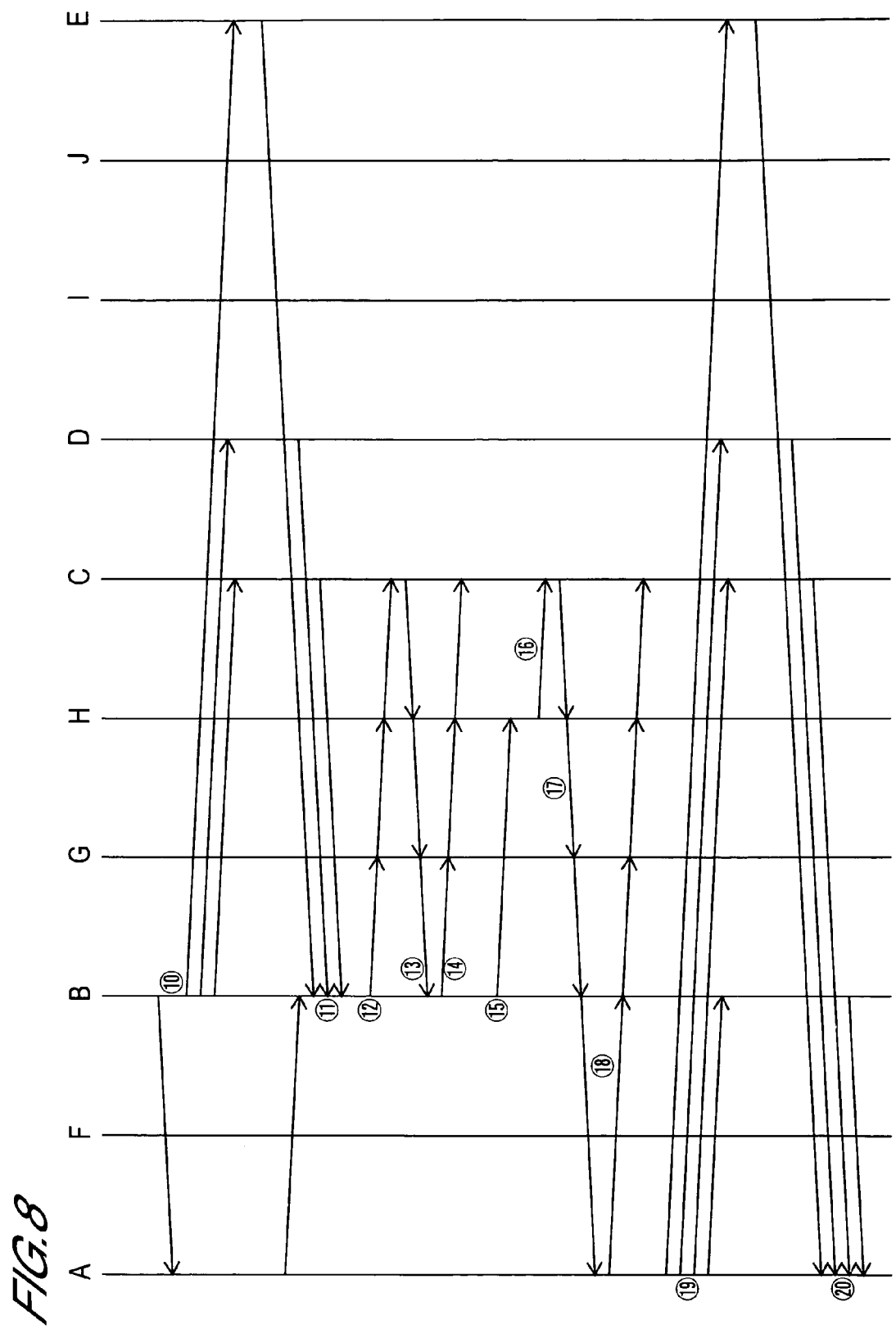
FIG. 8 is a diagram depicting the flow of a message in the communication path change processing according to the second embodiment.

FIG. 6 is a conceptual diagram depicting the IP tunnel according to the present embodiment. FIG. 7 and FIG. 8 are conceptual diagrams depicting the flow of a message in the optical path setup processing according to the present embodiment.

The initial setup status of the optical path is the same as FIG. 2A. The optical path A-F-G-H-I-D is used for the traffic between A and D.

According to the present embodiment, if it is judged that the change of the IP packet transfer route is necessary in the processing (3), the IP tunnel setup function 112a of the router A transmits an IP tunnel setup request to other LSC edge routers D and E. By this, the IP tunnel A-F-J-E-J-I-D is set as a path substituting the optical path A-F-G-H-I-D to be cancelled (see IP tunnel 601 in FIG. 6A). Each router D and E, which set the IP tunnel, reports the completion of setting the IP tunnel to the router A in the processing (4).

In the same way, in the processing (10), the LSC edge router B transmits the IP tunnel setup request to the LSC edge routers A, C, D and E. By this, in the processing (11), the IP tunnel B-G-F-A-F-J-E-J-I-D-I-H-C is set as a path substituting the optical path B-G-H-C to be cancelled (see IP tunnel 602 in FIG. 6B). Each LSC edge router A, C, D and E, which set the IP tunnel, reports the completion of setting the IP tunnel to the router B.

These IP tunnels are cancelled (not illustrated) after the setting of the new optical path A-F-G-H-C completes (see processing (20)).

The other processings (1), (2), (5)-(9) and (12)-(20) are the same as the first embodiment (see FIG. 3 and FIG. 4).

Here the IP tunnel can be set by an administrator, for example.

According to the communication network system of the present embodiment, when one router cancels a current path setting, this setting is notified to the other routers to shelter traffic, just like the first embodiment, so packet loss due to path cancellation can be prevented.

Additionally according to the communication network system of the present embodiment, an IP tunnel is set when an optical path is cancelled. Therefore in the communication network of the present embodiment, only the traffic that passes through the optical path to be cancelled is moved when the traffic is sheltered, so the time required for sheltering traffic can be decreased.

Third Embodiment

The communication network system according to the third embodiment will now be described with reference to FIG. 9-FIG. 16.

In the above mentioned second embodiment, an IP tunnel is constructed as a path for sheltering traffic. Whereas in the present embodiment, a path for sheltering traffic is constructed using PSC-LSP (a communication path constructed by a packet). Therefore the communication network system according to the present embodiment comprises three types of nodes.

Figure 9:
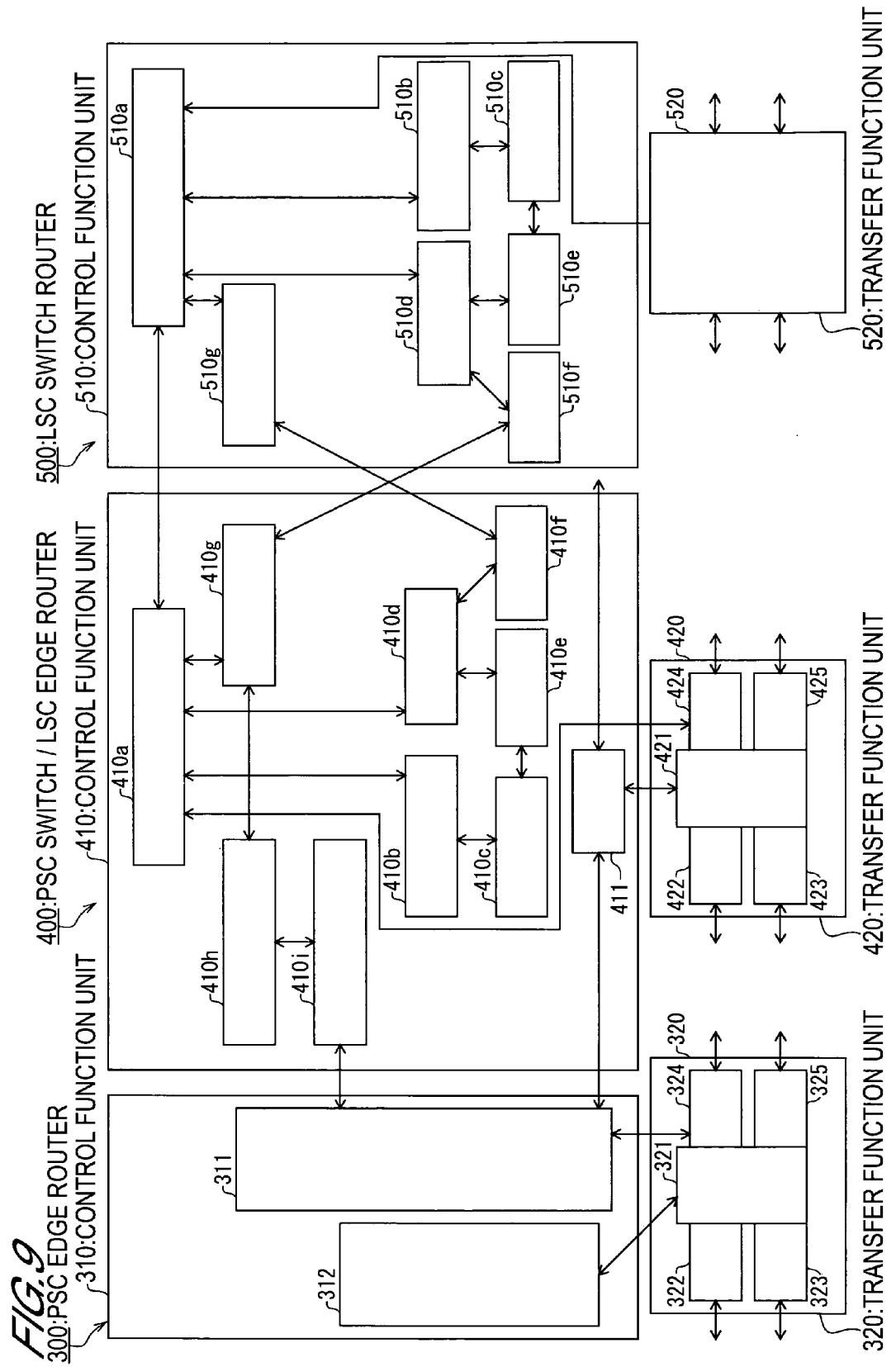
FIG. 9 is a conceptual diagram depicting the configuration of a router according to the third embodiment.

FIG. 9 is a block diagram depicting the functional configuration of the nodes according to the present embodiment. As FIG. 9 shows, the present embodiment comprises a PSC edge router 300, PSC switch/LSC edge router 400 and LSC switch router 500 as nodes.

The PSC edge router 300 is an IP router having a PSC interface. In other words, the PSC edge router 300 has a function to terminate the path (PSC path) provided by a switching operation using the packet header information as an identifier, in addition to the interface function of the IP router and the node function to transfer based on the IP packet header. The PSC edge router 300 further comprises a control function unit 310 and transfer function unit 320.

The control function unit 310 comprises a PSC control function 311 and an IP packet transfer control function unit 312. The PSC control function 311 controls the switching of the output direction of the PSC path and the switching of a path in IP packet units. The IP packet transfer control function unit 312 controls the switching of the output direction in IP packet units.

The transfer function unit 320 comprises an IP packet transfer function unit 321, router interface functions 322 and 323, and PSC path termination interface functions 324 and 325. The IP packet transfer function unit 321 transfers IP packets. The router interface functions 322 and 323 are interface functions similar to that of a conventional router. The PSC path termination interface functions 324 and 325 are functions to terminate a PSC path.

The PSC switch/LSC edge router 400 comprises a function as a PSC switch router and a function as an LSC edge router. The PSC switch/LSC edge router 400 has a function to terminate the path (LSC path) provided by the switching operation using a optical wavelength as an identifier, in addition to the function to switch the direction of the PSC path based on the label information by a packet header. The PSC switch/LSC edge router 400 further comprises a control function unit 410 and a transfer function unit 420.

The control function unit 410 switches the output direction of the LSC path and switches the path in IP packet units.

The transfer function unit 420 further comprises a PSC path switch function unit 421, PSC path termination interface functions 422 and 423, and LSC path termination interface functions 424 and 425. The PSC path switch function unit 421 switches a path of an IP packet. The PSC path termination interface functions 422 and 423 are functions to terminate the PSC path. The LSC path termination interface functions 424 and 425 are functions to terminate the LSC path.

The LSC switch router 500 switches the output direction in multiplexed LSC path units. This LSC switch router 500 does not switch the output direction in packet units. The LSC switch router 500 further comprises a control function unit 510 and transfer function unit 520. The functions of the control function unit 510 and the transfer function unit 520 are the same as the functions of the control function unit 210 and the transfer function unit 220 of the LSC switch router 200 according to the first embodiment (see FIG. 1).

Figure 10:
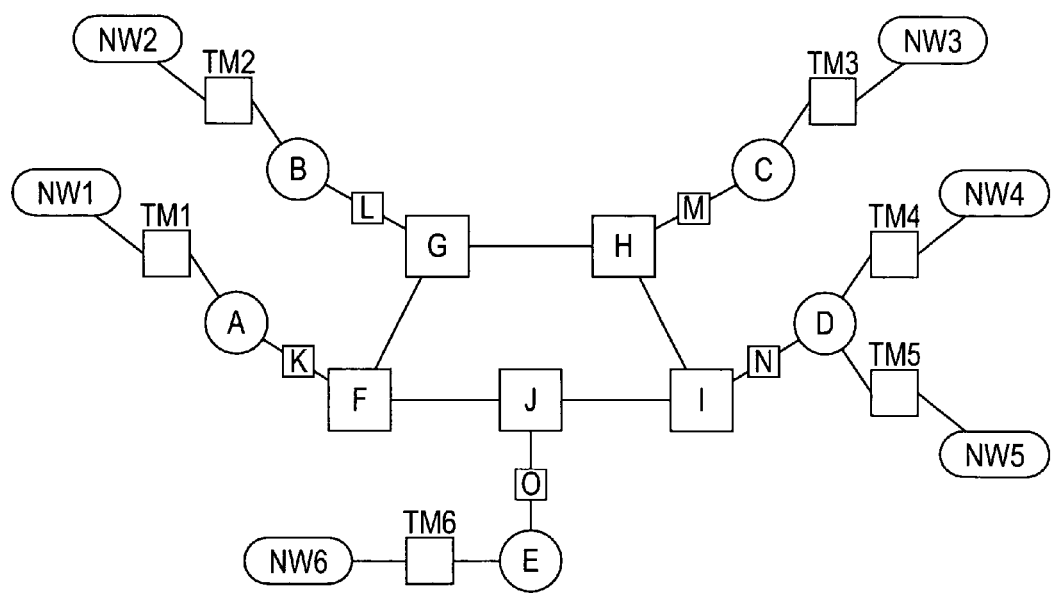
FIG. 10 is a conceptual diagram depicting a general configuration of a communication network system according to the third embodiment.

FIG. 10 is a conceptual diagram depicting the configuration of the communication network system according to the first embodiment. In FIG. 10, the PSC edge router 300 in FIG. 9 is used for the routers A-E, the LSC switch router 500 in FIG. 9 is used for the nodes F-J, and the PSC switch/LSC edge router 400 in FIG. 9 is used for the nodes K-O.

Figure 11:
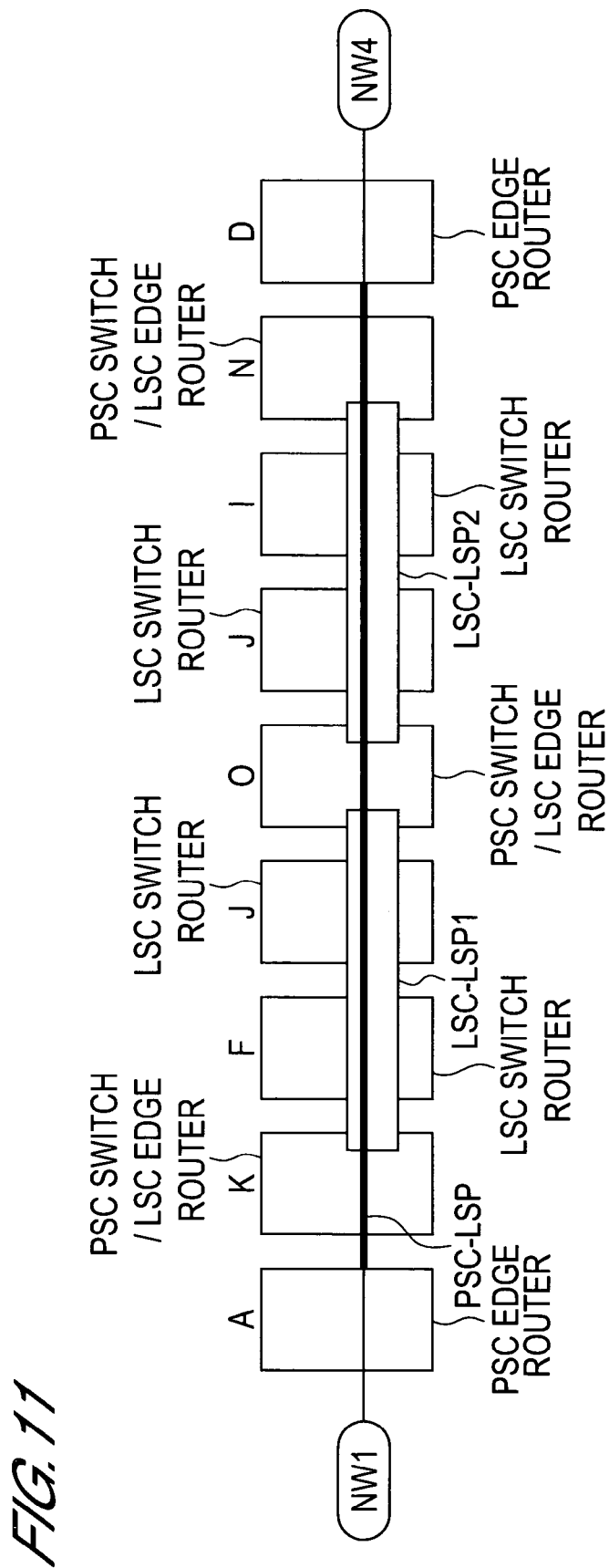
FIG. 11 is a conceptual diagram depicting the communication path configuration of the communication network system according to the third embodiment.

FIG. 11 and FIG. 12 are conceptual diagrams depicting the setup mode of LSC-LSP and PSC-LSP in the communication network system of the present embodiment. FIG. 11 corresponds to the communication path A→K→F→J→O→J→I→N→D in FIG. 10.

As FIG. 11 shows, the LSC-LSP is set between the LSC edge routers installed in the PSC switch/LSC edge router using the LSC switch router as a relay node. In other words, the LSC-LSP1 is set between the PSC switch/LSC edge routers K and O using the LSC switch routers F and J as relay nodes, and the LSC-LSP2 is set between the PSC switch/LSC edge routers O and N using the LSC switch routers J and I as relay nodes. Here the LSC-LSP is not always set between all the PSC switch/LSC edge routers (LSC edge routers)(see the later mentioned FIG. 12B).

The PSC-LSP, on the other hand, is installed between the PSC edge routers using the PSC switch installed in the PSC switch/LSC edge router as a relay node. In other words, the PSC-LSP in FIG. 11 is set between the PSC edge routers A and D using the PSC switch/LSC edge routers K, O and N as relay nodes. Here PSC-LSP is set between all the PSC edge routers in a full-mesh topology (see the later mentioned FIG. 12A).

In the PSC-LSP, a plurality of IP packets are multiplexed and transferred. In the LSC-LSP1 and LSC-LSP2, a plurality of PSC-LSPs are set in multiplexed situation.

Figure 12A:
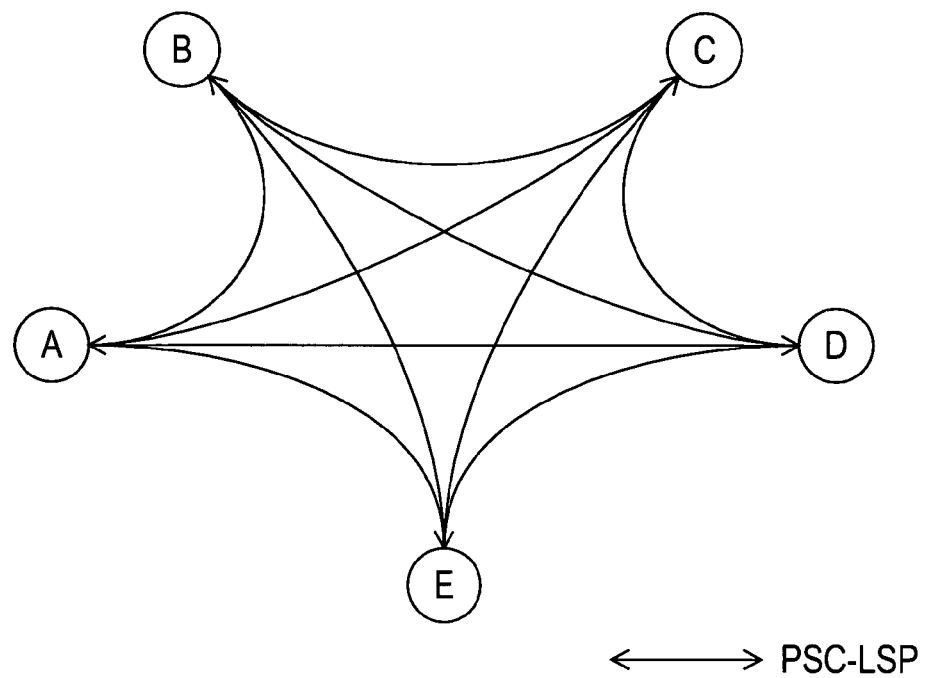
FIGS. 12A and 12B is a conceptual diagram depicting the communication path configuration of the communication network system according to the third embodiment.
Figure 12B:
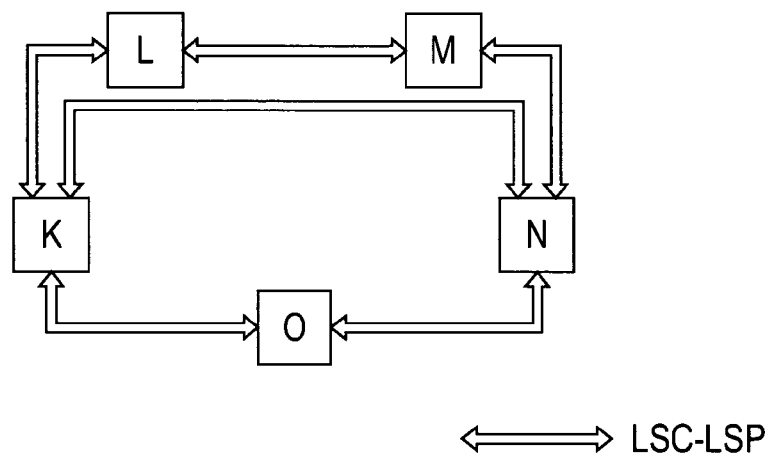

As FIGS. 12A and 12B shows, in the communication network system of the present embodiment, the PSC-LSP is set in a full mesh topology between all the PSC edge routers (see FIG. 12A), but the LSC-LSP is not always set between all the LSC edge routers (PSC switch/LSC edge routers) (see FIG. 12B). This is because a PSC-LSP, which is a logical communication path, has no physical limits in the number of paths, while an LSC-LSP, which is a communication path using optical wavelengths, has physical limits. In other words, increasing the number of LSC-LSPs increases the number of wavelengths to be used, which increases the cost of an interface, and so increases the cost of an entire communication network system.

In the communication network system according to the present embodiment, traffic can be sheltered in PSC-LSP units instead of being sheltered in IP packet units. In other words, traffic can be sheltered by sheltering the PSC-LSP, included in the LSC-LSP to be cancelled, to a separate unit.

Figure 13A:
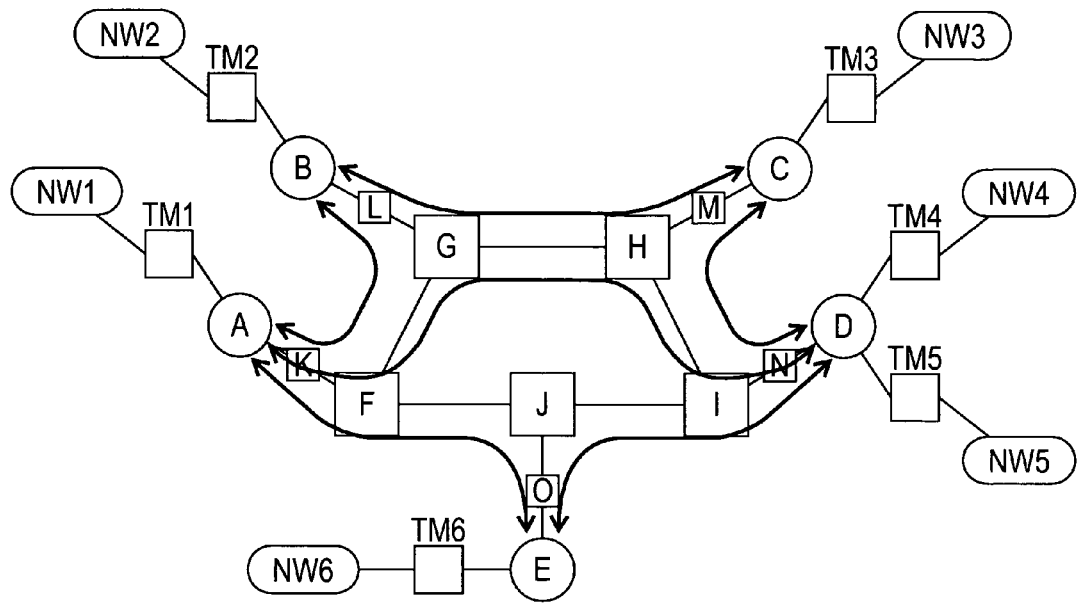
FIGS. 13A and 13B is a conceptual diagram depicting the communication path change processing according to the third embodiment.

Now communication path change processing according to the present embodiment will be described with reference to FIG. 13A-FIG. 16. FIG. 13A-FIG. 16 are diagrams depicting the communication path change processing of the present embodiment, where FIGS. 13A and 13B is a conceptual diagram depicting the communication network system, and FIG. 14-FIG. 16 are diagrams depicting the flow of a message.

FIG. 13A shows the concept of an example of the initial communication path status (before change). In the case of the example shown in FIG. 13A, the LSC path K-F-G-L, LSC path L-G-H-M, LSC path M-H-I-N, LSC path K-F-G-H-I-N, LSC path K-F-J-O and LSC path N-I-J-O are set using LSC-LSP. Using these LSC-LSPs, the PSC-LSP is set in a logical full mesh topology between nodes A-E. Herein below, let us consider the case when a request to set the path K-F-G-H-M (see FIG. 13B), as a new LSC-LSP, is issued in this path status. The number of parentheses in the following description corresponds to a number in a circle in FIG. 14 to 16.

Figure 13B:
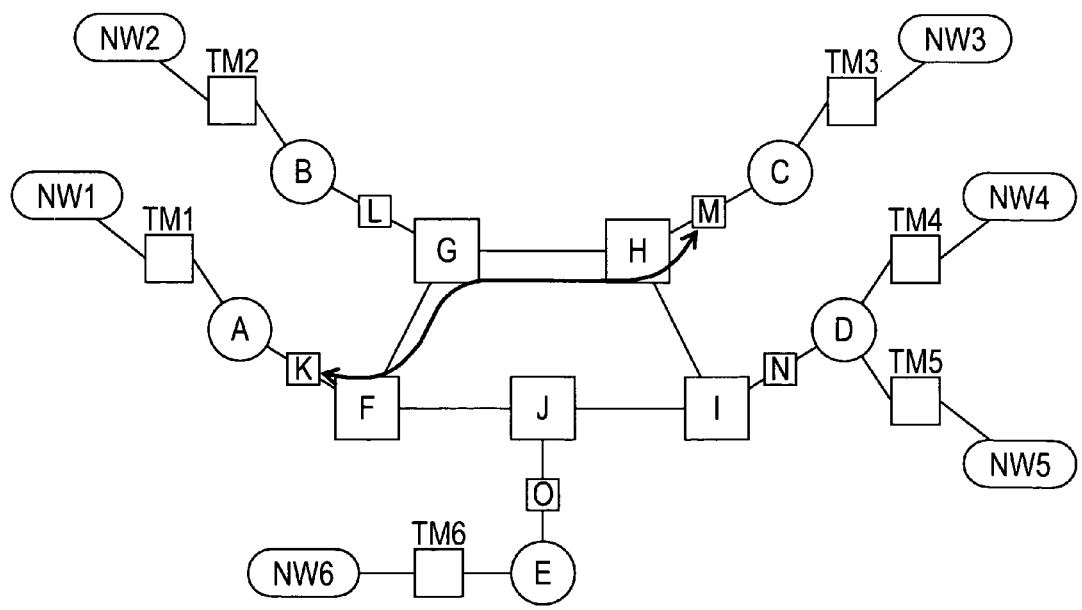
Figure 14:
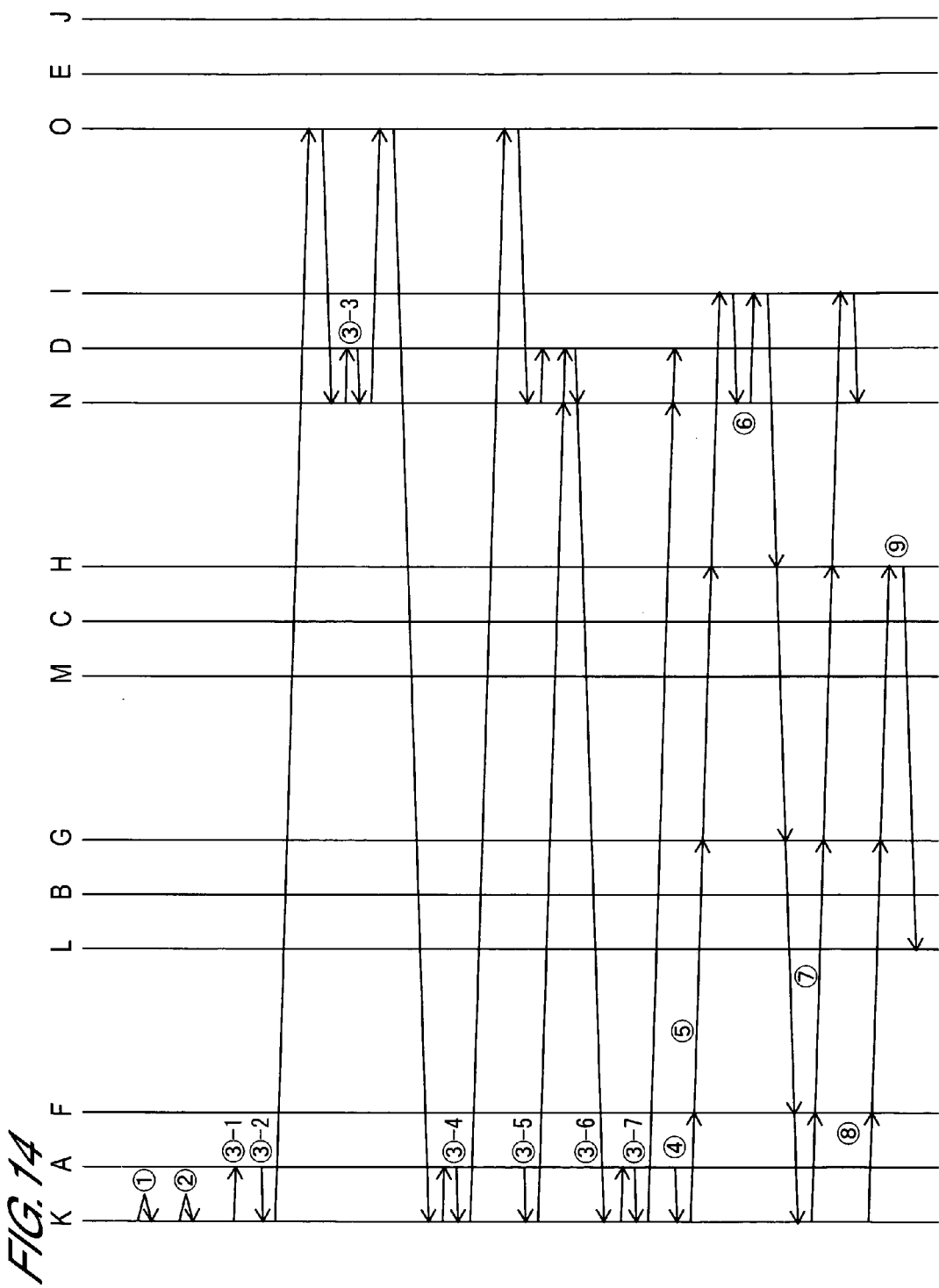
FIG. 14 is a diagram depicting the flow of a message in the communication path change processing according to the third embodiment.

(1) First the system control unit (not illustrated) in the PSC switch/LSC edge router K requests the control function unit 410 (see FIG. 9) of the PSC switch/LSC edge router K to set the path K-F-G-H-M (see FIG. 13B).

(2) The LSC path setup cancellation function 410a in the control function unit 410 inquires the LSC path setup resource confirmation update function 410b whether a resource to set the new path K-F-G-H-M is available. The LSC path setup resource confirmation update function 410b judges the availability of the resource using the path resource information stored in the LSC path resource information management function 410c, and replies the result to the LSC path setup cancellation function 410a. If the received reply is that a resource required for setting the path is insufficient, then the LSC path setup cancellation function 410a requests the LSC path resource insufficiency handling function 410d to execute resource securing processing. The LSC path resource insufficiency handling function 410d has the cancellation LSC path search function 410e check the availability of a path that can be cancelled. The cancellation LSC path search function 410e decides an LSC-LSP to be cancelled (path K-F-G-H-I-N in this case) using the path resource information stored in the LSC path resource information management function 410c. The result of this decision is sent to the LSC path setup cancellation function 410a via the LSC path resource insufficiency handling function 410d. When the result of this decision is received, the LSC path setup cancellation function 410a requests the LSC path cancellation request reception handling function 410g to cancel the path K-F-G-H-I-N via the LSC path cancellation request function 410f.

The LSC path cancellation request reception handling function 410g inquires the PSC path transfer route change necessity judgment function 410h whether the change of the PSC path is necessary. The PSC path transfer route necessity judgment function 410h judges whether it is possible that traffic will be lost if the path K-F-G-H-I-N is cancelled in this status. The judgment result is sent to the LSC path cancellation request reception handling function 410g. If it is judged that the change of the PSC path is necessary, the following processing is executed.

(3-1) First the LSC path cancellation request reception handling function 410g sends a shelter request to the PSC edge router A via the PSC path transfer route change necessity judgment function 410h and the PSC path transfer route change request function 410i.

(3-2) The PSC control function unit 311 of the PSC edge router A decides a PSC-LSP for sheltering, and sends an instruction to set this PSC-LSP for sheltering to the PSC path control function 411 of the PSC switch/LSC edge router K. In this case, it is assumed that the instruction to set the path A-K-O-N-D (see FIG. 11) is sent as the PSC-LSP for sheltering. When this setup instruction is received, the PSC path control function 411 of the PSC switch/LSC edge router K sets the corresponding PSC-LSP for sheltering, and transfers this setup instruction to the PSC switch/LSC edge router O. Then this setup instruction is sequentially transferred to the PSC switch/LSC edge router N and the PSC edge router D, and the PSC-LSP for sheltering is set in these routers, N and D.

(3-3) When setting of the PSC-LSP for sheltering completes, the PSC edge router D issues a setup completion notice. This setup completion notice is sequentially transferred to the PSC switch/LSC edge routers N, O and K, and is sent to the PSC edge router A.

(3-4) When this setup completion notice is received, the PSC edge router A issues a setup confirmation notice. This setup confirmation notice is sequentially sent to the PSC switch/LSC edge routers K, O and N, and is received by the PSC edge router D.

(3-5) Then the PSC control function 311 of the PSC edge router A issues an instruction to cancel the path K-F-G-H-I-N. This cancellation instruction is sent to the PSC path control function 411 of the PSC switch/LSC edge router K. When this cancellation instruction is received, the PSC control function 411 of the PSC switch/LSC edge router K cancels the corresponding PSC-LSP, and transfers this cancellation instruction to the PSC switch/LSC edge router N. The PSC switch/LSC edge router N cancels the corresponding PSC-LSP, and transfers this cancellation instruction to the PSC edge router D.

(3-6) The PSC edge router D issues a cancellation completion notice. This cancellation completion notice is sent to the PSC edge router A via the PSC switch/LSC edge routers N and K.

(3-7) When this cancellation completion notice is received, the PSC edge router A issues a cancellation confirmation notice. This cancellation confirmation notice is transferred to the PSC edge router D via the PSC switch/LSC edge routers K and N.

(4) Then a shelter completion notice is issued by the PSC control function 311 of the PSC edge router A. The PSC path control function 411 of the PSC switch/LSC edge router K receives this shelter completion notice.

(5) The LSC path cancellation request reception handling function 410g of the PSC switch/LSC edge router K requests the LSC path setup cancellation function 410a to cancel the LSC-LSP. And the LSC path setup cancellation function 410a issues an instruction to cancel the path K-F-G-H-I-N. When the cancellation instruction is received, each node K, F, G, H, I and N cancels the corresponding LSC-LSP, then transfers this cancellation instruction sequentially to the next node.

(6) When the cancellation instruction reaches the PSC switch/LSC edge router N, the path setup cancellation function of this router N issues a path cancellation completion notice. This path cancellation completion notice is transferred in the sequence of nodes N→I→H→G→F→K by the LSC path setup cancellation function 410a of these nodes. By this, the completion of the cancellation of the path is reported to the PSC switch/LSC edge router K.

(7) When this path cancellation completion notice is received, the LSC path setup cancellation function 410a of the PSC switch/LSC edge router K issues a path cancellation confirmation notice to confirm the receipt of this notice. This path cancellation confirmation notice is transferred in the sequence of nodes K→F→G→H→I→N by the LSC path setup cancellation functions 410a and 510a of these nodes. By this, the resource K-F-G-H out of the resources for setting the new path K-F-G-H-M is secured.

(8) Then processing to set the new path K-F-G-H-M is executed. In this processing, the LSC path setup cancellation function 410a of the PSC switch/LSC edge router K issues an instruction to set the path K-F-G-H-M. This setup instruction is sent from the LSC path setup cancellation function 410a of the router K to the LSC path setup cancellation function 510a of the LSC switch router F (see FIG. 9). When this setup instruction is received, the LSC path setup cancellation function 510a of the LSC switch router F checks whether a resource between nodes F-G has a room. If the resource has a room, the LSC path setup cancellation function 410a of the optical switch F reserves the resource for this path, and transfers the setup instruction to the LSC switch router G. The switch G checks the resource between the nodes G-H again using the LSC path setup resource confirmation update function 510b and the LSC path resource information management function 510c, and reserves the resource and transfers the setup instruction if there is a room. In the same way, the LSC switch router H checks a resource between the nodes H-M.

(9) Here the case when a resource to set the new path is not available in the nodes H-M is considered. In this case, the LSC path setup cancellation function 510a of the LSC switch router H selects a cancellation candidate using the LSC path resource insufficiency handling function 510d and LSC cancellation path search function 510e. Here it is assumed that the path L-G-H-M is selected as the cancellation candidate. The LSC path setup cancellation function 510a of the LSC switch router H checks the priority of the path L-G-H-M. And the LSC path setup cancellation function 510a decides to cancel the path L-G-H-M if this priority is lower than the priority of the new path K-F-G-H-M. If this decision is made, the LSC path cancellation request function 510f of the LSC switch router H requests the LSC path setup cancellation function 410g of the PSC switch/LSC edge router L to cancel the path L-G-H-M.

(10) Then the shelter instruction is sent from the PSC switch/LSC edge router L to the start node of the PSC-LSP which uses the LSC-LSP to be cancelled. In this example, the shelter request is sent to the PSC edge routers A and B. Specifically, it is necessary to shelter A-K-L-M-C and B-L-M-C, which are PSC-LSP.

(11-1) The PSC edge router A, which received the shelter request, issues an instruction to set the PSC-LSP for sheltering traffic. Here it is assumed that PSC-LSP for sheltering traffic is the path A-K-O-N-M-C. The PSC edge router A sets the corresponding PSC-LSP for sheltering, and transfers the shelter request to the PSC switch/LSC edge router F. The PSC switch/LSC edge router F sets the corresponding PSC-LSP for sheltering, and transfers the shelter request to the PSC switch/LSC edge router O. In the same way, the PSC-LSP for sheltering is set, and the shelter request is transferred to routers O, N, M and C sequentially.

(11-2) When the setup of the PSC-LSP for sheltering completes, the PSC edge router C issues a setup completion notice for PSC-LSP for sheltering. This setup completion notice is received by the PSC edge router A via the routers C, M, N, O and F.

(11-3) When this setup completion notice is received, the PSC edge router A issues a setup confirmation notice for PSC-LSP. This setup confirmation notice is sequentially transferred to the routers K, L, M and C.

(11-4) Then the PSC edge router A issues a cancellation instruction to cancel the PSC-LSP in the LSC-LSP included in the path K-F-G-H-M to be cancelled. The PSC edge router A cancels the corresponding PSC-LSP, and transfers the cancellation instruction to the PSC switch/LSC edge router K. The PSC switch/LSC edge router F cancels the corresponding PSC-LSP, and transfers the cancellation instruction to the PSC switch/LSC edge router O. In the same way, the PSC-LSP is cancelled, and the cancellation instruction is transferred in the sequence of the routers O, N, M and C.

(11-5) When the cancellation of the PSC-LSP completes, the PSC edge router C issues a cancellation completion notice of PSC-LSP. This cancellation completion notice is received by the PSC edge router A via the routers C, M, N, O and K.

(11-6) When the cancellation completion notice is received, the PSC edge router A issues a cancellation confirmation notice of PSC-LSP. This cancellation confirmation notice is sequentially transferred to the routers K, O, N, M and C.

(11-7) The PSC edge router B, which received the shelter request in the above processing (10), issues an instruction to set the PSC-LSP for sheltering traffic. Here it is assumed that the PSC-LSP for sheltering traffic is the path B-L-K-O-N-M-C. The PSC edge router B sets the corresponding PSC-LSP for sheltering, and transfers the shelter request to the PSC switch/LSC edge router L. The PSC switch/LSC edge router L sets the corresponding PSC-LSP for sheltering, and transfers the shelter request to the PSC switch/LSC edge router K.

In the same way, the PSC-LSP for sheltering is set, and the shelter request is transferred in the sequence of the routers K, O, N, M and C.

(11-8) When the setup of the PSC-LSP for sheltering completes, the PSC edge router C issues a setup completion notice of PSC-LSP for sheltering. This setup completion notice is received by the PSC edge router B via the routers C, M, N, O, K and L.

(11-9) When this setup completion notice is received, the PSC edge router B issues a setup confirmation notice of the PSC-LSP. This setup confirmation notice is sequentially transferred to the routers L, K, O, N, M and C.

(11-10) Then the PSC edge router B issues an instruction to cancel the communication path B-L-M-C. This cancellation instruction is sent to the PSC path control function 411 of the PSC switch/LSC edge router L. When this cancellation instruction is received, the PSC control function 411 of the PSC switch/LSC edge router L cancels the corresponding PSC-LSP, and transfers this cancellation instruction to the PSC switch/LSC edge router M. The PSC switch/LSC edge router M cancels the corresponding PSC-LSP, and transfers this cancellation instruction to the PSC edge router C.

(11-11) The PSC edge router C issues a cancellation completion notice. This cancellation completion notice is sent to the PSC edge router B via the PSC switch/LSC edge routers M and L.

(11-12) When this cancellation completion notice is received, the PSC edge router B issues a cancellation confirmation notice. This cancellation confirmation notice is transferred to the PSC edge router C via the PSC switch/LSC edge routers L and M.

(11-13) Then the PSC edge routers A and B send the shelter completion notice to the PSC switch/LSC edge router L.

(12) When the shelter completion notice is received, the LSC path setup cancellation function 410a of the PSC switch/LSC edge router L issues an instruction to cancel the path L-G-H-M. This instruction is transferred in the sequence of nodes L→G→H→M by the path setup cancellation functions 410a and 510a of these nodes. The nodes L, G, H and M cancel the path according to this cancellation instruction. To cancel the path, the LSC path cancellation request reception handling functions 410g and 510g are used.

(13) Then the PSC edge router M issues a path cancellation completion notice. This path cancellation completion notice is transferred in the sequence of M→H→G→L. By this, the completion of the cancellation of the path is reported to the PSC switch/LSC edge router L.

(14) When the path cancellation completion notice is received, the LSC path setup cancellation function 410a of the PSC switch/LSC edge router L issues a confirmation notice for confirming the receipt of this notice. This notice is transferred in the sequence of the nodes L→G→H→M by the LSC path setup cancellation functions 410a and 510a of these nodes.

(15) Then the LSC path setup cancellation functions 410a of the PSC switch/LSC edge router L sends a notice to indicate the completion of the cancellation processing for the path L-G-H-M to the LSC switch router H as a reply to the cancellation request in the above mentioned (9).

(16) When this notice is received, the LSC switch router H checks a resource between the nodes H-C again. And the LSC switch router H reserves an resource's room, and transfers an instruction to set the new path K-F-G-H-M to the PSC switch/LSC edge router M.

(17) When this setup instruction is received, the PSC switch/LSC edge router M issues a path setup completion notice. This path setup completion notice is transferred in the sequence of the nodes M→H→G→F→K by the path setup cancellation function of these nodes. By this, the completion of setting the path is reported to the router K.

(18) When the path setup completion notice is received, the LSC path setup cancellation function 410a of the router K issues a confirmation notice to confirm reception of this notice. This notice is transferred in the sequence of the nodes K→F→G→M→H by the path setup cancellation function of these nodes.

(19) Also the LSC path setup cancellation function 410a of the PSC switch/LSC edge router K notifies each PSC edge router A, B, C, D and E that the new path K-F-G-H-M is now available.

(20) The PSC edge routers A, B, C, D and E change the setup of the transfer function unit 320, and notify the completion of this change to the PSC switch/LSC edge router K.

According to the communication network system of the present embodiment, when the current path setting of one router is cancelled, this setting is notified to the other routers to shelter traffic, just like the first embodiment, so packet loss due to path cancellation can be prevented.

Additionally according to the present embodiment, all the routers A-O can be logically connected in a full mesh topology, so even if LSC-LSP is changed, the topology of the physical layer seems not to be changed. Therefore such a protocol as OSPF and RIP become to be able to be used.

Fourth Embodiment

The communication network system according to the fourth embodiment of the present invention will now be described with reference to FIG. 17.

FIG. 17 is a conceptual diagram depicting the configuration of the communication network system according to the present embodiment. As FIG. 17 shows, the difference from the third embodiment (see FIG. 9) is that the communication network system of the present embodiment comprises a route confirmation function 1710 and buffer function 1720.

The route confirmation function 1710 confirms the establishment of a desired communication path by sending a packet corresponding to the trace route command. For example, by the route confirmation function 1710, the actual completion of setting of the PSC-LSP for sheltering is confirmed after the processing (3-4) in FIG. 14 first, then the processing (3-5), that is the cancellation processing of the path K-F-G-H-I-N, can be executed. By this, the sheltering of traffic can be executed with certainty.

The buffer function 1720 temporarily stores packets during the period from the setting of the change of the communication path to the confirmation of the completion of the setting. For example, packets can be stored in the buffer 1720 from receiving of the setup instruction of the PSC-LSP for sheltering in the processing (3-2) in FIG. 14 to receiving the setup completion notice of this PSC-LSP for sheltering in the processing (3-4). By this, the loss of packets can be prevented with certainty. Also if the packet arrival sequence is reversed when a communication path is changed, these packets can be rearranged.

The route confirmation function 1710 and buffer function 1720 of the present embodiment can be applied to the communication network system according to the first and second embodiments.

If functions 1710 and 1720 of the present embodiment is applied to a communication network system according to the first embodiment, the completion of the setting of the changed route can be confirmed first after the processing (11) in FIG.

4, and then the path cancellation processing in the processing (12) can be executed, for example.

In the same way, if the functions 1710 and 1720 of the present embodiment is applied to a communication network system according to the second embodiment, the completion of the setting of the IP tunnel can be confirmed first after the processing (11) in FIG. 8, and then the path cancellation processing in the processing (12) can be executed, for example.

As described above, according to the present embodiment, the route confirmation function 1710 and buffer function 1720 are included, so packet loss can be prevented with even more certainty.

In the first to fourth embodiments, an arbitrary method can be used to determine a non-priority path of which traffic is sheltered when a priority path is set. For example, a cost calculation based on the link use amount may be performed for decision, or simply a route of which the number of relay nodes is the smallest may be selected.

If a suitable route is not available as a route to which the traffic of a non-priority path is sheltered, it is also possible that traffic is not sheltered. In other words, traffic may be sheltered according to the present invention only when a suitable route is available.

In the first and second embodiments, the communication network is implemented by two layers, that is an IP packet network and an LSC-LSP network, and in the third embodiment, the communication network is implemented by three layers, that is an IP packet network, PSC-LSP and LSC-LSP network. However the present invention is not limited to a communication network having such a hierarchical structure, but can be applied to a communication network with any hierarchical structure only if a combination of a high layer network and low layer network is used. The present invention, however, can exhibit a greater effect as the difference in the density of each layer is greater (in other words, as the difference in the number of available paths is greater).

What is claimed is:

1. An optical communication network system for dynamically changing communication paths constructed using a plurality of nodes, comprising:
    a resource confirmation unit which confirms sufficiency of a resource for setting a new communication path;
    a cancellation path select unit which selects a current communication path to be cancelled from a plurality of current communication paths to secure said resource when said resource is insufficient, wherein said current communication path has a lower priority than said new communication path;
    a traffic sheltering unit which shelters traffic of said current communication path to another of said plurality of current communication paths;
    a path cancellation unit which cancels said current communication path after sheltering of said traffic by said traffic sheltering unit is complete; and
    a path setting unit which sets said new communication path after said path cancellation unit cancels said current communication path.

2. The optical communication network system according to claim 1, wherein said resource confirmation unit, said cancellation path select unit, said traffic sheltering unit, said path cancellation unit and said path setting unit are provided in each of said node.

3. The optical communication network system according to claim 2, wherein one or more of said nodes comprise a switch router which only executes setting, changing and canceling of said communication paths of high layer domain, and one or more of remain of said nodes comprise edge router which executes setting, changing and canceling of said communication paths of high layer domain and low layer domain.

4. The optical communication network system according to claim 1, wherein sheltering said traffic is executed by a router that issues a path change request and sends it to other routers.

5. The optical communication network system according to claim 4, wherein said other routers which changed said communication paths send back change completion notices to said router which issued said path change request, wherein said router is an edge router.

6. The optical communication network system according to claim 3, wherein cancellation of said communication paths is executed by a first edge router issuing a path cancellation instruction at one terminal of said communication path to be cancelled, wherein the instruction is transmitted to a second edge router positioned at the other terminal of the communication path via corresponding other nodes in sequence.

7. The optical communication network system according to claim 6, wherein a path cancellation completion notice is issued by said second edge router and the path cancellation completion notice is transmitted by a route opposite to said first edge router.

8. The optical communication network system according to claim 7, wherein a receipt confirmation notice of said path cancellation completion notice is issued by said first edge router and the receipt confirmation notice is transmitted by a route opposite to said second edge router.

9. The optical communication network system according to claim 3, wherein setting of said communication paths is executed by a first edge router positioned at one terminal of said communication path to be set issuing a path setup instruction, wherein the instruction is transmitted to a second edge router positioned at the other terminal of the communication path via corresponding other nodes in sequence.

10. The optical communication network system according to claim 9, wherein a path setup completion notice is issued by said second edge router and the path setup completion notice is transmitted by a route opposite to said first edge router.

11. The optical communication network system according to claim 10, wherein a receipt confirmation notice of said path setup completion notice is issued by said first edge router and the receipt confirmation notice is transmitted by a route opposite to said second edge router.

12. The optical communication network system according to claim 3, wherein said traffic sheltering unit shelters said traffic by changing a high layer domain's route table of said router so that a lower layer domain's current communication paths other than said lower layer domain's current communication path to be cancelled can be used.

13. The optical communication network system according to claim 3, wherein said high layer domain is an internet protocol domain, and said traffic sheltering unit shelters said traffic by setting an internet protocol tunnel between routers located at both ends of low layer domain's current communication path to be cancelled.

14. The optical communication network system according to claim 2, wherein said traffic sheltering unit shelters said traffic by setting a communication path for sheltering in a layer different from the layer in which said current communication path to be cancelled.

15. The optical communication network system according to claim 1, further comprising a route confirmation unit confirming that setting of the communication path for sheltering by said traffic sheltering unit is completed, before said path cancellation unit cancels said current communication path.

16. The optical communication network system according to claim 1, further comprising a buffer unit temporarily storing transmission data to be passed through said current communication path to be cancelled, during the period from said cancellation path select unit selecting said current communication path to be cancelled to said traffic sheltering unit completing the sheltering.

17. The optical communication network system according to claim 1, further comprising a buffer unit rearranging receipt transmission data and ending it.

18. The optical communication network system according to claim 1, wherein said traffic sheltering unit shelters said traffic only when it is possible that traffic will be lost if the communication path is cancelled without sheltering.

19. The optical communication network system according to claim 1, wherein said traffic sheltering unit does not shelter said traffic when said another current communication path cannot be selected.

20. The optical communication network system according to claim 1, further comprising a traffic monitor monitoring the traffic of said communication path.

21. The optical communication network system according to claim 20, further comprising a management unit deciding a setting of said new communication path based on a traffic obtained by said traffic monitor.

22. The optical communication network system according to claim 21, wherein said management unit is provided in one or more of said nodes.

23. The optical communication network system according to claim 1, wherein said sheltering, canceling and setting of communication paths are executed corresponding to a domain of destination address.

24. The optical communication network system according to claim 23, wherein said domain of destination address is an Internet Protocol domain.

25. The optical communication network system according to claim 1, wherein said another of said plurality of current communication paths is selected so to lower resource cost.

26. The optical communication network system according to claim 25, wherein said resource cost is based on amount of used link.

27. The optical communication network system according to claim 25, wherein said resource cost is based on number of relay nodes.

* * * * *